US011072901B2

(12) United States Patent
Schupp

(10) Patent No.: US 11,072,901 B2
(45) Date of Patent: Jul. 27, 2021

(54) FOUNDATION FOR A STRUCTURE

(71) Applicant: Ørsted Wind Power A/S, Fredericia (DK)

(72) Inventor: Jens Schupp, Denmark (DK)

(73) Assignee: Ørsted Wind Power A/S, Fredericia (DK)

(*) Notice: Subject to any disclaimer, the term of this patent is extended or adjusted under 35 U.S.C. 154(b) by 0 days.

(21) Appl. No.: 16/470,958

(22) PCT Filed: Dec. 20, 2017

(86) PCT No.: PCT/EP2017/083909
§ 371 (c)(1),
(2) Date: Jun. 18, 2019

(87) PCT Pub. No.: WO2018/115176
PCT Pub. Date: Jun. 28, 2018

(65) Prior Publication Data
US 2020/0018034 A1    Jan. 16, 2020

(30) Foreign Application Priority Data
Dec. 24, 2016  (EP) .................................... 16206897
Feb. 21, 2017  (EP) .................................... 17157171

(51) Int. Cl.
*E02D 27/42* (2006.01)
*E02D 27/52* (2006.01)
(Continued)

(52) U.S. Cl.
CPC .............. *E02B 17/00* (2013.01); *E02D 13/00* (2013.01); *E02D 27/425* (2013.01);
(Continued)

(58) Field of Classification Search
CPC ............. E02B 17/00; E02B 2017/0065; E02B 2017/006; E02B 2017/0039;
(Continued)

(56) References Cited

U.S. PATENT DOCUMENTS 3,398,071 A * 8/1968 Bagno ................... E04B 1/7007
                                                 204/515
3,523,884 A * 8/1970 Bagno ................. C04B 41/4505
                                                 204/196.36

(Continued)

OTHER PUBLICATIONS

PCT/EP2017/083909, International Search Report and Written Opinion, dated Mar. 28, 2018, 5 pages.

*Primary Examiner* — Edwin J Toledo-Duran
(74) *Attorney, Agent, or Firm* — Han Santos, PLLC

(57) ABSTRACT

A foundation (1) for a structure such as an off-shore wind turbine. The foundation (1) comprises a body (4) having a lateral surface (8,9) and a distal end (5) for insertion into a soil (2). At least a region of the lateral surface (8,9) forms a first electrode. A second electrode (7) is provided on the lateral surface (8,9) of the body (4) and is electrically insulated from the first electrode. The body (4) further comprises a spacing formation (6) for forming a gap (11) between the second electrode (7) and the soil (2) when the body (4) is inserted into the soil (2). In use, an electric potential may be established between the electrodes to induce electro-osmosis in the soil for allowing the foundation to be installed more easily. The polarity of the electric potential may also be reversed for stabilising the foundation.

14 Claims, 17 Drawing Sheets

(51) Int. Cl.
  *E02B 17/08* (2006.01)
  *E02B 17/00* (2006.01)
  *F03D 13/25* (2016.01)
  *E02D 13/00* (2006.01)
  *H02K 7/18* (2006.01)

(52) U.S. Cl.
  CPC ............ *E02D 27/525* (2013.01); *F03D 13/25* (2016.05); *H02K 7/183* (2013.01); *E02B 17/0836* (2013.01); *E02B 2017/006* (2013.01); *E02B 2017/0039* (2013.01); *E02B 2017/0065* (2013.01); *E02B 2017/0082* (2013.01); *E02B 2017/0091* (2013.01); *F05B 2240/95* (2013.01)

(58) Field of Classification Search
  CPC ......... E02B 2017/0082; E02B 17/0836; E02B 2017/0091; H02K 7/183; F03D 13/25; E02D 27/525; E02D 27/425; E02D 13/00; F05B 2240/95
  USPC .............. 204/18 R, 299, 300; 61/36 R, 53.5; 166/248; 175/19
  See application file for complete search history.

(56) References Cited

U.S. PATENT DOCUMENTS

| | | | | | |
|---|---|---|---|---|---|
| 3,915,826 | A | * | 10/1975 | Franceschini | E02D 3/11 204/515 |
| 4,046,657 | A | * | 9/1977 | Abbott | E02D 7/00 204/515 |
| 4,119,511 | A | * | 10/1978 | Christenson | B01D 61/56 166/248 |
| 4,124,483 | A | * | 11/1978 | Christenson | B01D 61/56 204/648 |
| 4,157,287 | A | * | 6/1979 | Christenson | E02D 7/00 166/248 |
| 4,205,362 | A | * | 5/1980 | Butterfield | B25D 11/064 173/1 |
| 4,305,800 | A | * | 12/1981 | Christenson | B01D 61/56 166/248 |
| 4,311,415 | A | * | 1/1982 | Christenson | B01D 61/56 204/515 |
| 4,733,993 | A | * | 3/1988 | Andreasson | B63B 21/26 405/224 |
| 4,799,557 | A | * | 1/1989 | Jacquemet | B25D 11/064 173/117 |
| 6,346,188 | B1 | * | 2/2002 | Shuster | C23F 13/06 205/734 |
| 7,775,774 | B2 | * | 8/2010 | Kothnur | E02D 7/06 405/228 |
| 2005/0252775 | A1 | * | 11/2005 | Malone | B01D 61/56 204/553 |
| 2006/0110218 | A1 | * | 5/2006 | Beyke | B09C 1/06 405/128.8 |
| 2010/0224385 | A1 | * | 9/2010 | Gordin | H01R 4/66 174/6 |
| 2012/0282038 | A1 | * | 11/2012 | Khan | E02D 31/002 405/232 |
| 2014/0021039 | A1 | * | 1/2014 | Sergi | C23F 13/14 204/196.27 |
| 2014/0021062 | A1 | * | 1/2014 | Sergi | C23F 13/06 205/730 |
| 2015/0183170 | A1 | * | 7/2015 | Ehsani | B29C 70/34 156/71 |
| 2015/0299868 | A1 | * | 10/2015 | Sergi | C23F 13/20 205/730 |
| 2020/0000050 | A1 | * | 1/2020 | Haran | A01G 25/167 |

\* cited by examiner

FOUNDATION FOR A STRUCTURE

The present invention concerns a foundation for a structure and a method and system for installing the same. In particular, the present invention concerns structural foundations, such as piles, tubular piles, closed ended piles, monopiles, bucket foundations, suction bucket foundations, suction pile foundations, suction caisson foundations, suction anchors, sheet piles, spudcans, shallow or gravity base foundations, and other types of temporary and permanent shallow or deep foundations, that may be inserted into a soil for supporting structures such as buildings, walls, sheet pile walls, offshore structures, and wind turbines. The foundations of the present invention are most suited to soils of low hydraulic permeability, typically with a high clay or silt content, as are often associated with offshore, deep sea, and coastal locations.

Structural foundations are often installed by driving the foundation into the ground using a pile hammer to apply a series of axial impacts to drive the foundation down into the soil. As it is driven, soil is displaced by the foundation pile, thereby compressing the surrounding soil and increasing the axial friction forces along the foundation's body. This thereby increases the foundation's axial load-bearing capacity. However, as the shear forces to overcome, while driving the foundation through the soil, are very high, several issues arise. Firstly, the high impact forces that are required for pile driving impose significant mechanical requirements on the foundation itself to avoid its failure during installation. Furthermore, the noise generated by the impacts can be extremely high. In the case of offshore installations, this poses a particularly significant environmental hazard to marine life.

In this respect, the installation of foundations for offshore structures can cause detrimental physical and behavioural effects to marine wildlife. In recent years, significant efforts have been made to mitigate the noise generated during such installations. For instance, bubble curtains are often required around the piling site to reduce the level of noise emitted from the piling location. However, the use of such noise mitigating measures adds considerable expense to the installation of offshore structures. For example, there is a significant increase in the overall installation time if a bubble curtain needs to be set up for each pile location. Furthermore, the costs involved with providing the bubble curtain and a separate bubble curtain vessel are significant and add considerable expense to the installation of an offshore wind park. This is a particular issue for larger foundations where the increased dimensions can render current noise mitigation options insufficient.

To address the above, research has been made into using electro-osmosis to reduce the pile driving resistance in offshore installations by attracting water in the soil towards the foundation body acting as a cathode. The pore water pressure at the interface between the foundation body and surrounding soil builds up, reducing the effective stresses, and thereby lowering the friction between the soil grains and the foundation surface. This has a lubricating effect by reducing the shear resistance required to drive the foundation down into the ground. This in turn allows installation to be achieved with a lower number of impacts and lower driving/hammer energy, resulting in quicker installation and less noise disturbance.

U.S. Pat. No. 4,157,287 discloses one such pile driving system using electro-osmosis. In U.S. Pat. No. 4,157,287, an electro-conductive tubular pile is provided with an electrically insulating coating on its exterior lateral surface and its interior lateral surface is left exposed to form a cathode. One or more anodes are then placed on the seabed adjacent to the pile and a direct current is applied to cause water to migrate through the soil down the outside of the pile towards the cathodic interior at its open end at the bottom. However, there are several issues with this arrangement. Firstly, the system of U.S. Pat. No. 4,157,287 requires anodes to be installed on the seabed adjacent to the pile. This adds considerably to the set-up time and expense of the installation. Secondly, to generate sufficient field strength to achieve an electro-osmotic effect, very high voltages are required because of the long distance between the electrodes, which itself is hazardous. Thirdly, because of the high voltages, the integrity of the electrical insulation over the entire exterior of the pile is crucial to avoid short circuiting. This makes the manufacture of such piles for use in this system much more expensive and less tolerant to defects. In practical terms, this means that the technique is too risky commercially to rely on; a bubble curtain and larger hammer would still be required at the location as a contingency if the coating was to fail during installation. As such, any potential cost savings are negated.

The present invention therefore seeks to address the above issues with the prior art.

According to a first aspect of the present invention there is provided a foundation for a structure comprising: a body having a lateral surface and a distal end for insertion into a soil, wherein at least a region of the lateral surface forms a first electrode; a second electrode electrically insulated from the first electrode; and wherein the second electrode is provided on the lateral surface of the body and the body further comprises a spacing formation for forming a gap between the second electrode and the soil when the body is inserted into the soil.

In this way, the present invention provides an arrangement in which the foundation assembly itself comprises first and second electrodes. This avoids the need to provide and install a separate counter-electrode on or in the seabed, and an electric potential difference may instead be established between different regions in the soil surrounding the foundation itself to thereby induce electro-osmosis and hence effect the pumping of water through the soil. At the same time, because the potential difference can be established between different regions of the foundation, the distances between the electrodes may be significantly shorter and more localised than that associated with prior art arrangements having a separate anode. This thereby allows lower voltages to be used whilst still generated a sufficiently strong electric field for inducing electro-osmotic flow. As such, during installation where the second electrode is the anode and the body is the cathode, water in the surrounding soil is attracted to the body, softening the soil and forming a lubricating film over its lateral surfaces. This allows the foundation to be driven more easily, and adhesion of the dehydrated soil around the second electrode is mitigated by the provision of the spacing formation.

In embodiments, the spacing formation comprises a recess and the second electrode is provided within the recess. In this way, the depth of the recess creates a gap for separating the second electrode from the soil into which water in the soil may then drain for establishing the electrolytic connection. That said, once electricity is applied such that the second electrode is an anode, water in the gap will be pushed into the soil, away from the anode. Eventually, this may cause a vacuum in the gap.

In embodiments, the spacing formation comprises a lateral projection for displacing soil away from the second electrode when the body is inserted into the soil. In this way, the soil is compressed away from the surface of the second electrode by the projection, such as a ridge or bead, as the foundation is driven down. This creates a gap behind the distally leading edge of the projection into which water in the soil and from the seabed may then drain for establishing the electrolytic connection.

In embodiments, the second electrode is electrically insulated from the first electrode by an insulating layer provided there between. This simplifies manufacture by allowing the foundation body to be formed of one material, with the insulating layer laminated to this, and the second electrode electrically isolated from the body by the lamination. The insulating layer may be provided as an adhesive for securing the second electrode to the first electrode. For example, the insulating layer may be sprayed on, with the spray comprising adhesive droplets.

In embodiments, the foundation further comprises a resistive coating provided on the lateral surface of the body for regulating an electric field strength between the first and second electrodes. In this way, the generation of an excessively high field strength in the area directly adjacent the junction between the second electrode and the body may be avoided. As such, in use, the conductor connected to the second electrode has to carry less current, and therefore is subjected to less heating and hence may be provided with a smaller cross-section. At the same time, the draining of excessive amounts of water towards the surface areas of the body next to the anode is also avoided. Consequently, the resistive coating may be used to even out the lubrication effect. In some embodiments, the resistive coating may be graduated for gradually mitigating the electric field strength nearer the second electrode. For example, in embodiments where the insulating layer is sprayed on, a resistive coating may be provided by graduating the density of spray. In this way, a smooth transition between full insulation and full conductivity may be provided as the sprayed-on paint/glue droplets become sparser.

In embodiments, the foundation further comprises a fluid port for supplying fluid to the surface of the second electrode or draining fluid from the surface of the second electrode. In this way, when the second electrode is functioning as an anode during the driving phase of installation, fluid can be supplied to the second electrode to maintain electrolyte conductivity as water is pumped into the soil, away from the electrode, potentially leaving a vacuum or non-conductive water vapor field space. The supply of fluid may also help to maintain the gap between the second electrode and the soil, providing a fluid water cushion. Conversely, when the second electrode is functioning as a cathode during a stabilisation operation, fluid can be drawn away from the second electrode site and pumped out elsewhere through an exhaust. This can avoid excessive softening in the soil surrounding the second electrode. Preferably, the fluid port connects to a fluid pipe system for providing fluid communication between the fluid port and a fluid pump. Preferably, the fluid pipe system extends to the proximal end of the foundation. Preferably, the fluid pipe system comprises an electrically insulated bore for preventing short circuiting. After installation, the fluid port and piping system may be sealed with grout or resin to stop water from being drawn down to this area while the foundation undergoes cyclic loading. Furthermore, in embodiments, a second fluid port and second piping system may also be provided so that the fluid can be circulated. This can be used to circulate electrolyte for optimising the electro-osmosis effect or electro chemical soil cementation.

In embodiments, the foundation further comprises terminals for connecting the first and second electrodes to an electric power supply. Preferably, the terminals comprise moveable attachments ends for attachment to the power supply. In this way, movement of the attachment ends may mitigate shock forces transmitted from the foundation to the attachment points. In this respect, the attachment ends may be resiliently moveable for mitigating forces, for example, by having a spring formation formed in the terminal material. In alternative arrangements a slidable contact may be provided. Magnets and/or a resilient membrane may be used to maintain contact of the slidable contact with the associated counter-surface.

In embodiments, the body is electrically conductive for functioning as the first electrode. In this way, the bulk material of the foundation body may form a common first electrode. For instance, the body may be grounded with a 0V potential for minimising safety issues with entities contacting the body.

In embodiments, the foundation further comprises a plurality of second electrodes and wherein the body further comprises a plurality of spacing formations for forming a gap between a respective one of the plurality of second electrodes and the soil when the body is inserted into the soil. In this way, a number of second electrodes may be provided over the foundation for generating the electro-osmosis effect over a greater area of the foundation. In some embodiments, the plurality of second electrodes are configured to have a common potential in use. In some embodiments, the plurality of second electrodes may be selectively activated for restricting their operation until the respective second electrode is below the soil surface. In some embodiments, the plurality of second electrodes and associated spacing formations may be arranged in sets at different vertical levels up the foundation body. In some embodiments, the plurality of second electrodes are configured to have different potentials in use. For example, the potential of electrodes on the inside and outside of a hollow foundation may be adjusted to provide different levels of lubrication between the surfaces. The interior and exterior of a bucket foundation for instance may be controlled to address the issue of plug lift. Plug lift occurs when suction forces during the suction assisted installation phase are sufficiently high to cause a clay layer overlaying a sand layer to be lifted inside the bucket. To address this, the lubrication on the outside of the bucket may be maximized by using a higher potential for reducing the required suction pressure. At the same time, the lubrication on the inside of the bucket may be set at a lower level or even reversed so that there is sufficient friction between plug and the inside of the bucket foundation for preventing the plug from sliding upwards.

In embodiments, the distal end of the body comprises an aperture opening to an internal cavity. In this way, the foundation may be provided as an open ended hollow body. That is, the pile toe at the distal end of the body may define an aperture to the foundation's hollow interior defined by its interior lateral surface.

In embodiments, the body is tubular. For instance, the foundation may be a monopile and may have an elongate tubular body that is over 10 m or 20 m long. In other embodiments, the foundation may be a bucket foundation having a circular footprint, and the bucket foundation may have a diameter of 4-16 metres and a vertical length of 2-30 metres, and preferably 7-12 metres in diameter and 2-9 meters penetration depth. In embodiments where the body has a hollow cavity, it may comprise an inner lateral surface.

According to a further aspect of the present invention, there is provided a wind turbine comprising: a generator assembly for generating electricity from wind; and a foundation according to the above for supporting the generator assembly. In this way, the foundation may provide the wind turbine's base, with the nacelle and rotor of the wind turbine generator assembly being supported above the foundation. The wind turbine may be installed for instance off-shore.

According to a further aspect of the present invention, there is provided a structural foundation system, comprising: a foundation according to the above; and a power supply for applying a potential difference across the first and second electrodes such that the first electrode is the cathode and the second electrode is the anode for attracting water in the soil to the first electrode to facilitate the insertion of the body into the soil. The structural foundation system may further comprise a fluid pump in fluid communication with the surface of the second electrode for suppling fluid to or draining fluid from the second electrode.

According to a further aspect of the present invention, there is provided a method of installing a foundation according to the above, the method comprising: connecting the second electrode to the positive terminal of a power supply for the second electrode to function as an anode; connecting the first electrode to the negative terminal of the power supply for the first electrode to function as a cathode; inserting the distal end of the body into the soil and applying a potential difference across the first and second electrodes for generating an electro-osmotic effect to attract water in the soil to the first electrode for thereby facilitating the insertion of the body into the soil. In this way, the foundation may be driven into the soil more easily.

According to a further aspect of the present invention, there is provided a method of stabilising a foundation according to the above, the method comprising: connecting the second electrode to the negative terminal of a power supply for the second electrode to function as a cathode; connecting the first electrode to the positive terminal of the power supply for the first electrode to function as an anode; applying a potential difference across the first and second electrodes for generating an electro-osmotic effect to repel water in the soil away from the first electrode. In this way, the soil surrounding the body of the foundation may be consolidated for strengthening the shear resistance between the foundation body and the soil. This allows the foundation to be stabilised. Indeed, not only may the interface strength between the soil and the foundation be restored to normal levels, but potentially the effect of additional soil consolidation may allow the interface strength to be improved beyond this. Moreover, this effect may also extend to beyond the immediate vicinity of the foundation. In addition, the stabilising process may also help to at least partially neutralise acidity that may have been generated in the soil during the installation process. That is, with the second electrode acting as the cathode, $OH^-$ ions are generated in the pore water in the surrounding soil, which can neutralise $H^+$ remaining from the installation processes.

According to a further aspect of the present invention, there is provided a method for adjusting a foundation according to the above that has been inserted into soil, the method comprising: connecting the second electrode to the positive terminal of a power supply for the second electrode to function as an anode; connecting the first electrode to the negative terminal of the power supply for the first electrode to function as a cathode; applying a potential difference across the first and second electrodes for generating an electro-osmotic effect to attract water in the soil to the first electrode; and moving the body in the soil. In this way, the foundation may be adjusted more easily, for example allowing the foundation to be retracted from the soil. This method may also be used to adjust the position of the foundation, for instance to reset a foundation which has moved due to extreme loading. This may be especially relevant for bucket foundations by reducing the friction to re-level the bucket for straightening the structure. In strong clay type soils, conventional methods of re-levelling of bucket foundations can be extremely difficult because the water pressure required to uninstall a bucket risks cracking the soil underneath. Often this means that inclined bucket foundations cannot be salvaged, and the bucket must be instead cut at the mudline to remove it. Embodiments of the present invention therefore provide for the elevation of single buckets to be corrected after a structure has become inclined beyond an acceptable limit.

According to a further aspect of the present invention, there is provided a pile for driving into a soil, comprising: an elongate body having a first electrode region for acting as a cathode and a second electrode region for acting as an anode; and a spacing formation provided on the elongate body for displacing soil away from the second electrode region as the pile is driven into the soil.

According to a further inventive arrangement, there is provided a foundation comprising: a base for insertion into a soil, wherein at least a region of the base surface forms a first electrode; a second electrode electrically insulated from the first electrode; and wherein the base further comprises a recess on a distally facing surface, the recess containing the second electrode and forming a gap between the second electrode and the soil when the base is inserted into the soil. In this way, the electro-osmosis effect may be provided in a foundation, such as a gravity base foundation or a spudcan. Gravity base foundations, for instance, rely on weight distributed over a large contact area to provide stability against lateral forces and overturning moments. However, excess pore pressures can build up over time below the foundation due to cyclic loading. Consequently, in addition to easier installation, the electro-osmosis effect achieved with the present inventive arrangements may be used to reduce the pore pressure and allow weak soil below the foundation to be strengthened. This may allow, for example, smaller foundation dimensions to be used or avoid the need to dredge away soft soil prior to installation.

Illustrative embodiments of the present invention will now be described with reference to the accompanying drawings in which.

Figure 1:
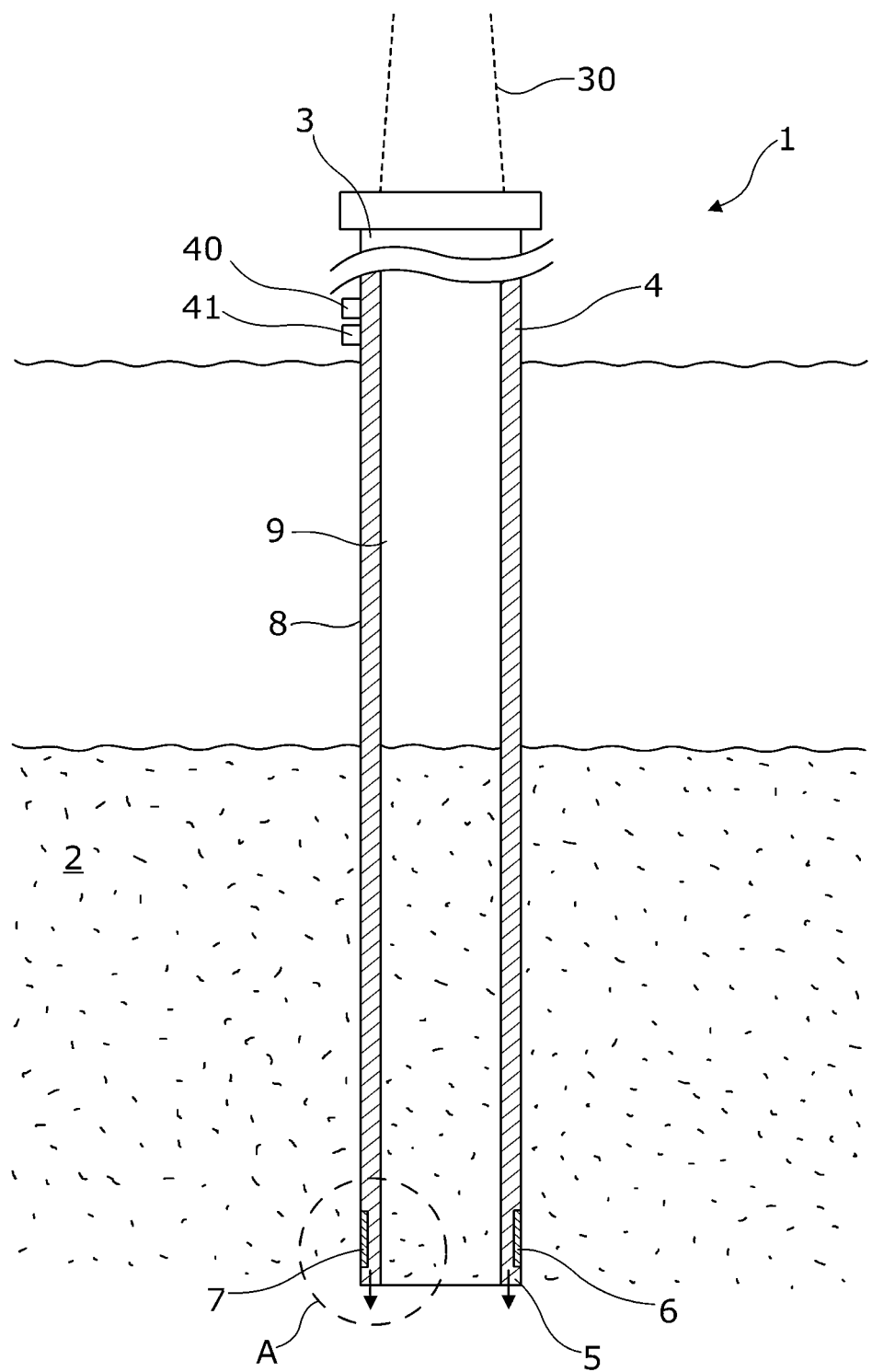
FIG. 1 shows a cross-sectional view of a foundation according to a first embodiment of the invention.

FIG. 1 shows a schematic cross-sectional view of a foundation 1 according to a first embodiment of the invention. In this embodiment, the foundation 1 is a monopile for an offshore wind turbine 30. The foundation 1 comprises a hollow tubular body 4 having a proximal end 3 for supporting the wind turbine 30 above the water level and a distal end 5 that has been inserted into the soil 2. The body 4 is electrically conductive for allowing its external lateral surface 8 and internal lateral surface 9 to function as a first electrode. In this embodiment, the body 4 is formed of metal for providing the electrical conductivity throughout the material, although other configurations are possible. For instance, other materials may be used, and/or conductive regions may be formed by applying a conductive coating to exposed surfaces. A first terminal 40 is provided at the proximal end 3 of the body 4 for electrically connecting the body 4 to a power supply (not shown).

A recess 6 is formed towards the distal end 5 of the body 4, providing a circumferential channel around its exterior lateral surface. A second electrode 7 is seated within the recess 6 and is electrically connected to a second terminal 41 at the proximal end 3 of the body 4 by wiring (not shown).

Figure 2:
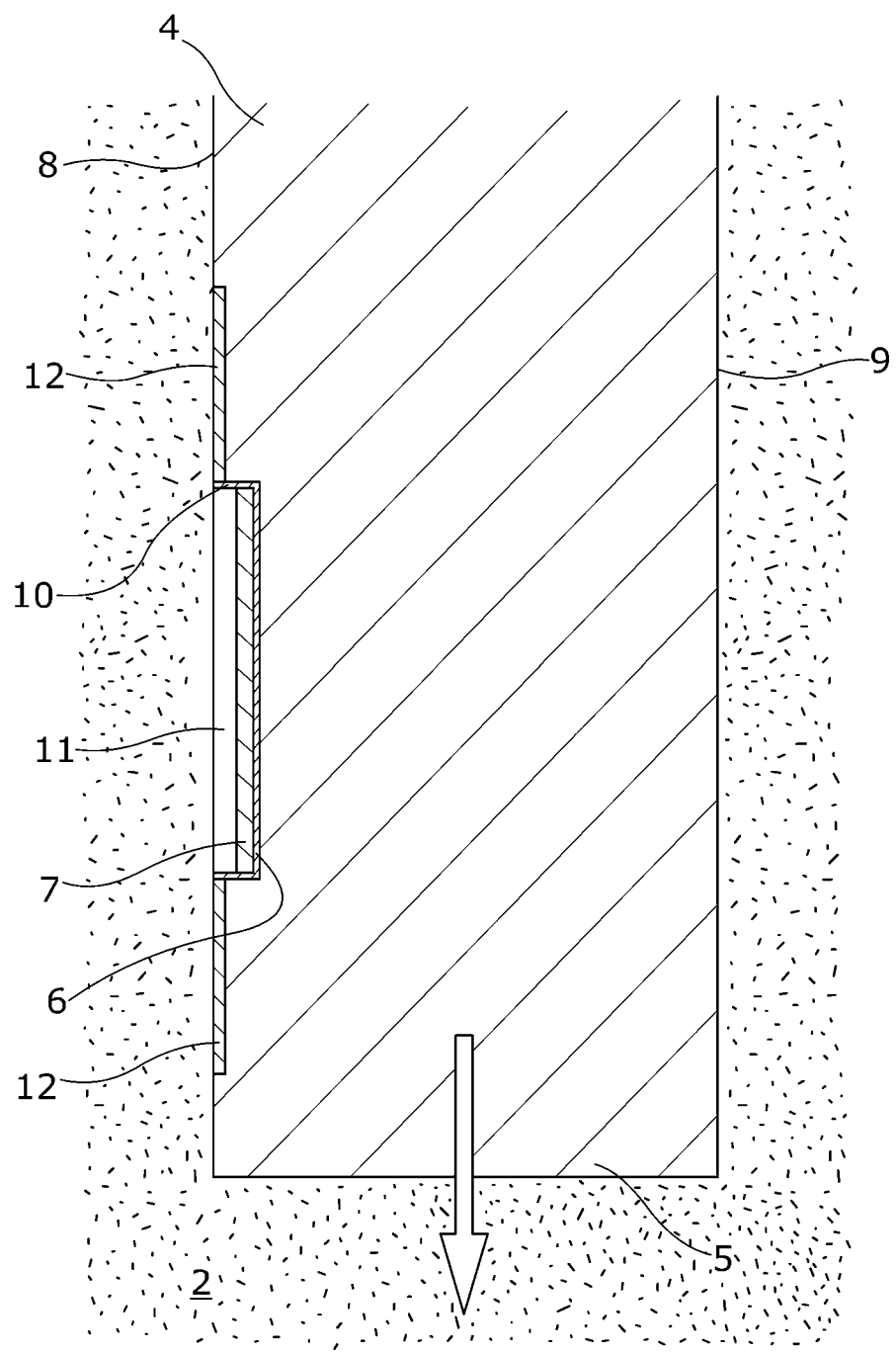
FIG. 2 shows an enlarged view of region A shown in FIG. 1.

FIG. 2 shows an enlarged view of the region A identified in FIG. 1. As shown, the recess 6 extends vertically over a region of the exterior lateral surface 8 of the body 4 adjacent to the body's distal end 5. The recess 6 is lined with an insulating layer 10, and the second electrode 7 is seated on the insulating layer 10 within the recess 6 to be electrically insulated from the body 4. In use, the second electrode 7 is electrically connected to a power supply through the second terminal 41 to thereby establish a potential difference between the second electrode 7 and the body 4 acting as the first electrode.

As the second electrode 7 is seated fully within the recess 6, a gap 11 is formed between the lateral surface of the second electrode and the plane defined by the external lateral surface 8 of the body 4. Preferably, the gap 11 formed by the recess 6 is around 0.5 cm to 1 cm deep. When the body 4 is inserted into the soil 2, soil particles are displaced away from the surface of the second electrode 7 by the body 4. At the same time, water will be trapped in this gap 11 as the bottom end 5 of the foundation 4 penetrates the soil from the seawater above. Furthermore, while the electric field is not applied, pore water from the surrounding soil may also migrate into the gap.

Figure 3:
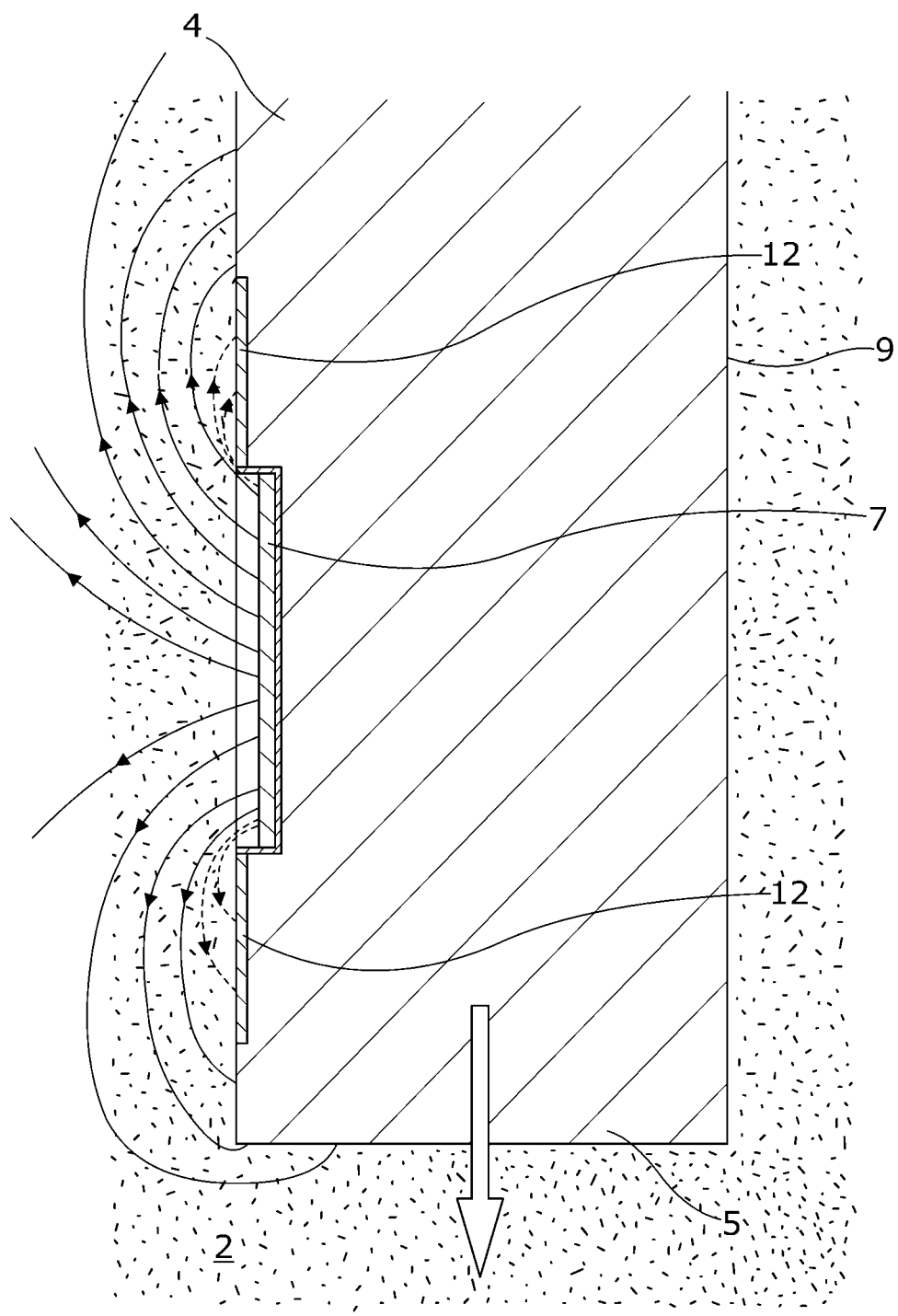
FIG. 3 shows a representation of the region shown in FIG. 2 with electric field lines shown.

Resistive coating regions 12 are provided on the external lateral surface 8 of the body 1, extending vertically either side of the second electrode 7. The resistive coating regions 12 act to control the electric field strength distribution in the soil generated between the body 4 and second electrode 7. That is, when a potential difference is applied across the electrodes, the resistive coating regions 12 act to reduce the electric field strength in the vicinity of the second electrode 7, as shown in FIG. 3. This thereby avoids an excessively high field strength being created in the area directly adjacent the junction between the second electrode 7 and the body 4 because of the small distance between the electrodes which might otherwise vaporise the water. In some embodiments, the resistive coating 12 may be graduated as the distance from the second electrode increases to taper down the resistive effect. In this way, the taper of the resistance may be used to gradually counter the increased electric field strength because of proximity to achieve a more uniform electric field extending from the second electrode 7.

FIG. 3 is based on FIG. 2 and shows a schematic representation of the electric field generated when the second electrode 7 is the anode and the body 4 is the cathode, which reflects the polarity applied when a foundation is being driven into the ground. In this respect, during this driving phase of installation, a positive voltage of preferably around +40V to +400V, and most preferably below around +80V, is applied to the second electrode 7. At voltages below around +80V, the voltage is advantageously below hazardous levels. At the same time, the body 4 is preferably grounded to have a 0V potential to thereby function as the cathode. In this way, as the body 4 itself has a zero potential, it doesn't present a safety hazard from contact with other bodies during installation. That is, the charged region of the foundation is isolated to the distal end of the body at the second electrode 7, which is buried beneath the soil 2.

Figure 4C:
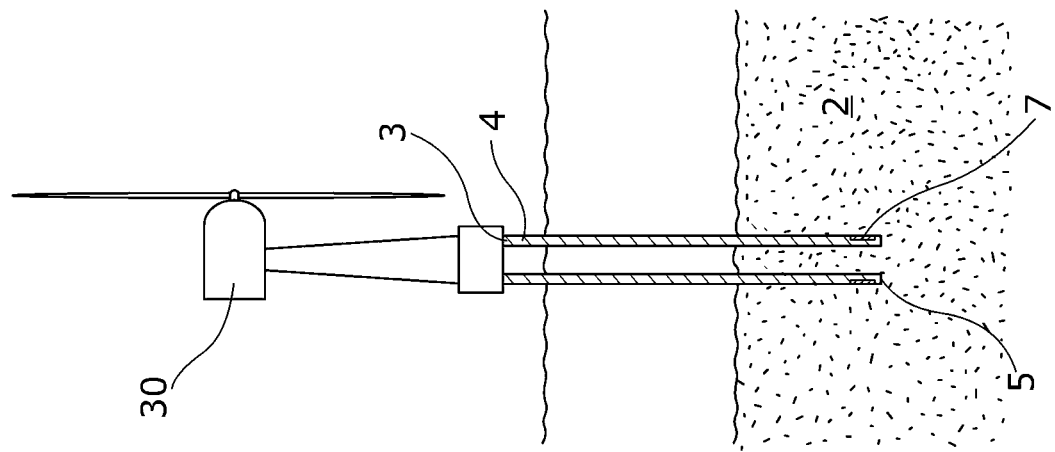
FIG. 4A-4C shows schematic representations of an off-shore wind turbine being installed using a foundation, system, and method according to embodiments of the invention.
Figure 4B:
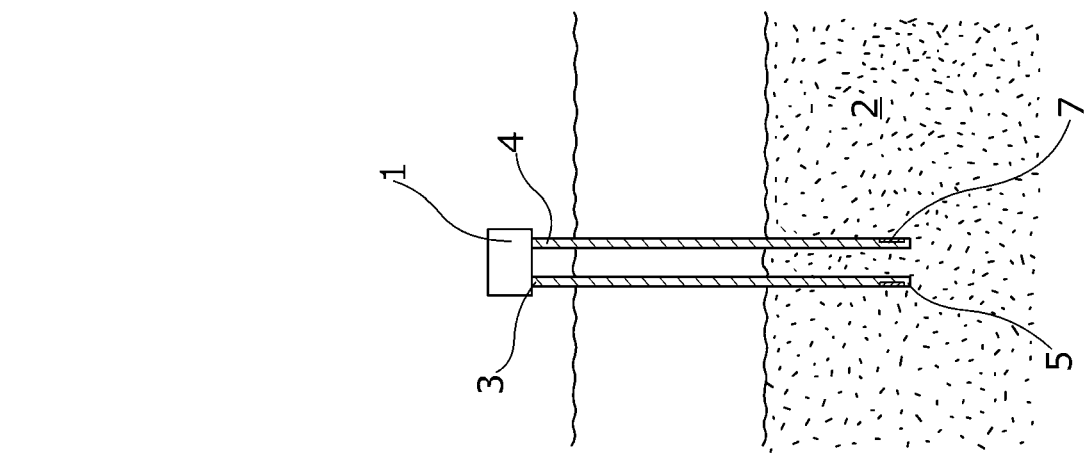
Figure 4A:
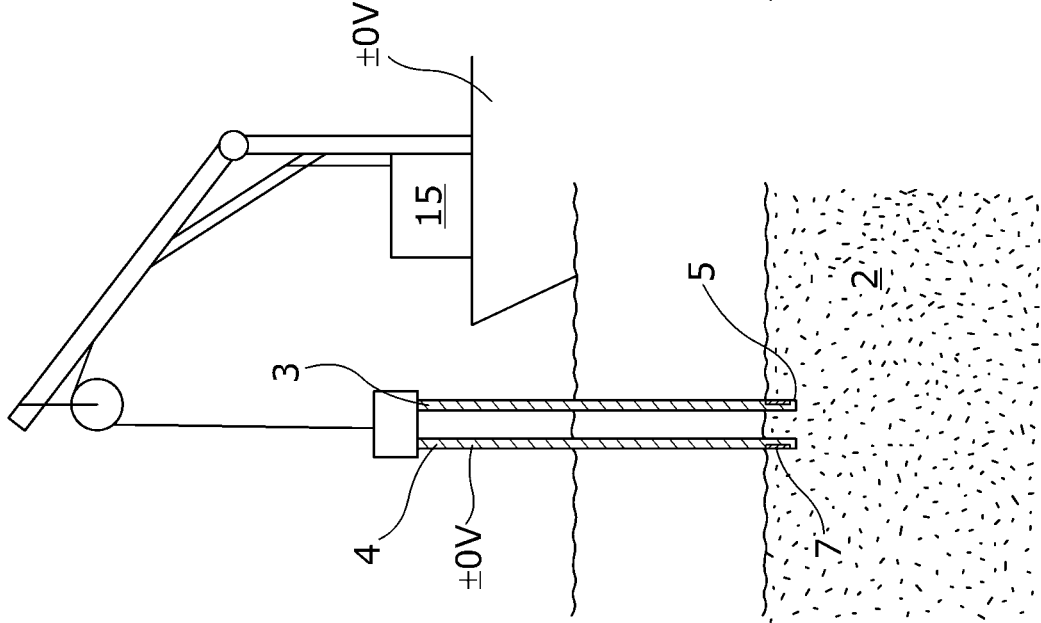

FIGS. 4A-4C show schematic illustrations of the foundation of FIGS. 1 to 3 being installed. As shown in FIG. 4A, the body 4 of the foundation 1 is positioned by a pile driving rig on the installation vessel 15 with its distal end 5 slightly submerged into the soil 2. Once the second electrode 7 is covered with soil, a DC power supply on the installation vessel 15 may be used to apply a potential difference through the first and second terminals 40 and 41. Preferably, the body 4 is grounded and a positive voltage of approximately +80V is applied to the second electrode 7. This results in a +80V potential difference between the second electrode 7 and the body 4, generating an electric field through the soil between them, as shown in FIG. 3.

The effect of the electric field shown in FIG. 3 is that an electro-osmosis effect is induced in the soil around the foundation. Specifically, within the soil, the negatively charged soil particles are surrounded by pore water fluid that lies within the double layer and/or in the unbound water zone between the particles. The application of the electric field moves a portion of this pore water toward the negatively charged cathode provided by the body 4. This has the effect of increasing soil moisture in the soil adjacent to the lateral surface 8 of the body 4, thereby lubricating the interface between the body 4 and the soil 2. In addition, water is also squeezed into the interface, causing a lubricating water film to form at the interface, with the water migrating upwards to regions of lesser soil contact stress, and thereby accelerating the lubrication effect in upper regions. At the same time, the positively charged anode provided by the second electrode 7 acts to repel pore water from it. Although this results in a consequential decrease in soil moisture in the surrounding soil, the gap 11 provided by the recess 6 avoids this dehydrated region sticking to the surface of the second electrode 7.

With the electro-osmosis effect established, the foundation 1 can be driven into the soil 2 more easily as the shear resistance between the soil and the lateral faces of the body 4 is reduced. As such, a lower number of impacts and/or lower impact forces are required to complete installation, reducing noise and thereby avoiding the need for other noise reducing measures. Indeed, in some locations having particularly soft moist clay, the electro-osmosis effect may be sufficient to allow the pile foundation 1 to be driven into the soil 2 using a weighted ballast alone and/or internal suction similar to a suction bucket foundation. Furthermore, for bucket foundations, the required suction pressure can be reduced, which may allow smaller diameter foundations to be installed deeper into the ground.

Once the distal end 5 of the foundation has reached the required depth, as shown in FIG. 4B, the shear resistance between the soil 2 and the lateral faces of the body 4 can be restored by turning off the power supply. This stops the electro-osmosis effect and stabilises the foundation by reducing its lubrication. However, this stabilisation may take time. This is because clay has a very low permeability, and hence excess pore pressure next to the foundation can take time to dissipate back into the soil. Therefore, stabilisation may optionally be further enhanced by temporarily reversing the polarity of the power supply so that the body 4 acts as the anode and the second electrode 7 acts as the cathode. This reverses the electric field shown in FIG. 3 so that pore water is driven away from the lateral surface 8 of the body 4, thereby enhancing the adhesion strength of the interface between the body 4 and the soil 2. As shown in FIG. 4C, a wind turbine 30 may then be installed on top the foundation 1. It will be appreciated that this effect may also be used to remove excess pore pressures around an axial or monopile foundation which might have been accumulated during cyclic loading.

Figure 5:
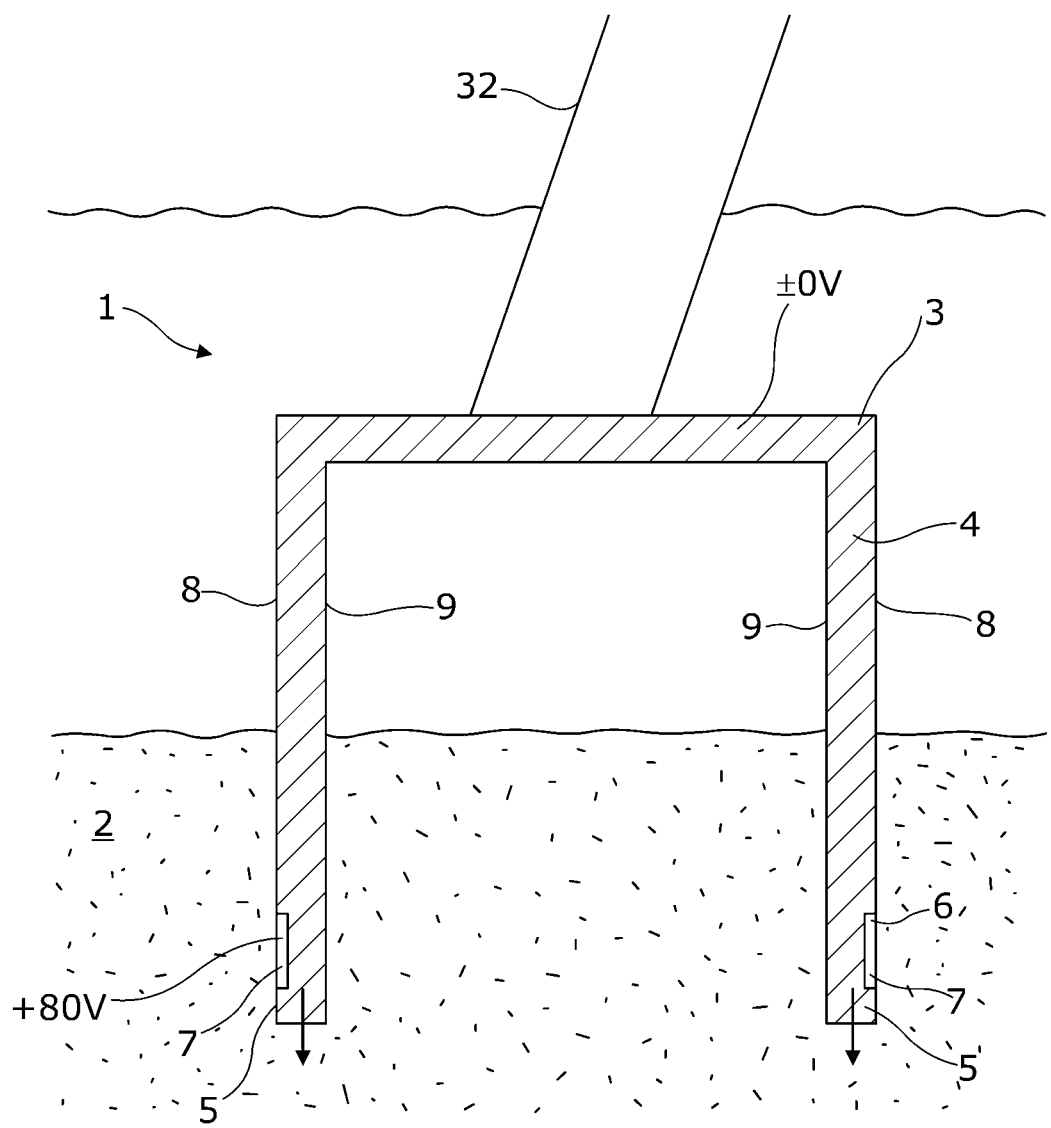
FIG. 5 shows a cross-sectional view of a foundation according to a second embodiment of the invention.

FIG. 5 shows a second embodiment of the present invention. In this embodiment, the foundation 1 is provided as a bucket foundation for supporting connecting leg 32 of a jacket structure (not shown). The second embodiment functions in the same way as the first embodiment, with the lateral sides of the bucket body 4 corresponding to the lateral sides of the tubular monopile shown in FIG. 1. The bucket body 4 has a skirt tip at its distal end 5 which defines an aperture into the bucket's hollow interior cavity. A circumferential recess 6 is provided on the exterior lateral surface 8, near the distal end 5 of the body. As with the first embodiment, the second electrode 7 sits within the recess 6. During installation, the body 4 is again grounded and a positive potential of +200V is applied to the second electrode 7 to attract pore water in the soil to the body 4 to allow the foundation to be installed into the soil 2 more easily.

Figure 6:
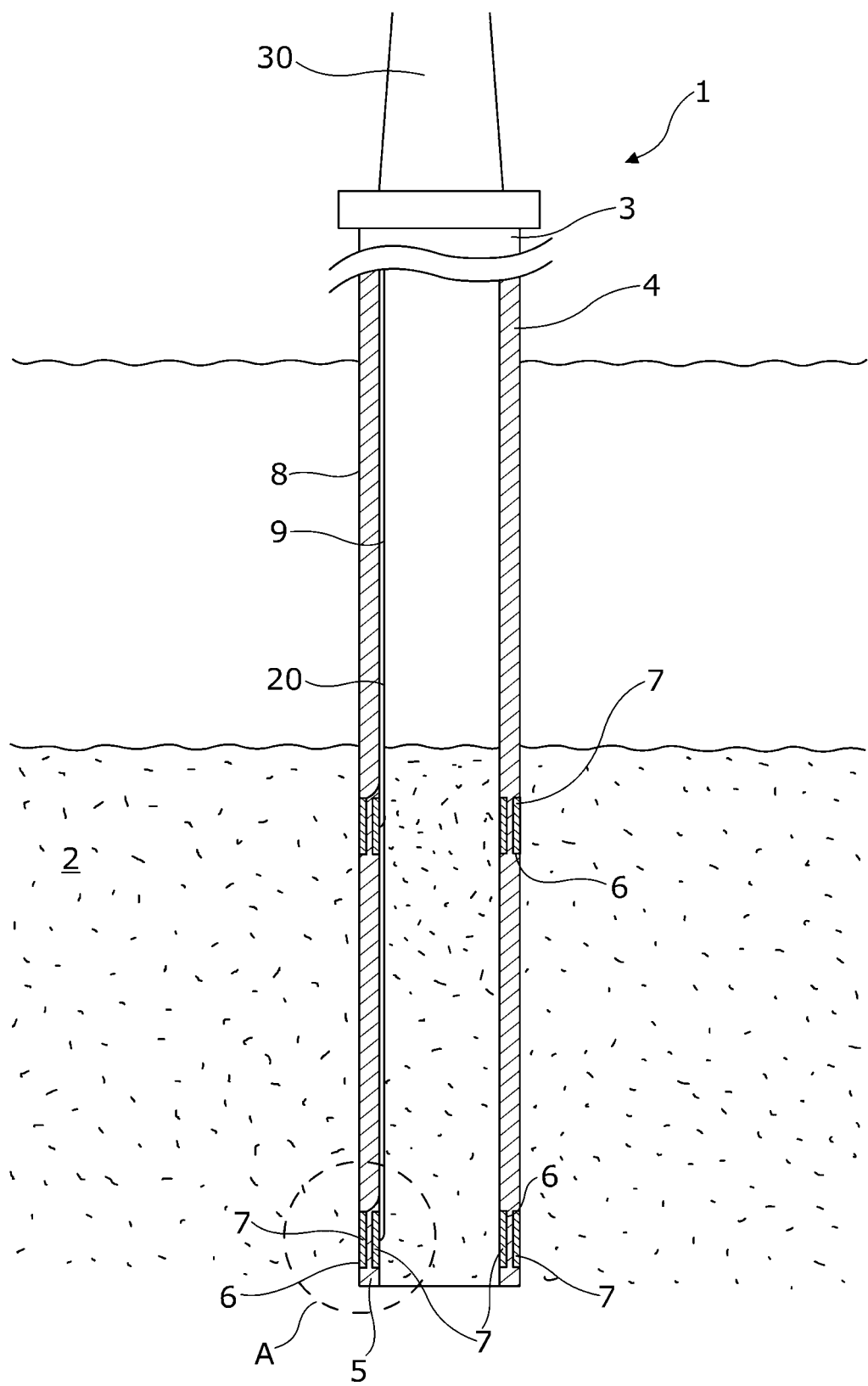
FIG. 6 shows a cross-sectional view of a foundation according to a third embodiment of the invention.

FIG. 6 shows a third embodiment of the present invention which, like the first embodiment, concerns a monopile foundation 1. However, in this embodiment, a plurality of second electrodes 7 and associated recess formations 6 are provided on the foundation body, each of which functions in the same way as the second electrode described in reference to FIGS. 2 and 3 of the first embodiment.

In this connection, in this embodiment there is a first set of second electrodes 7 provided towards the distal end 5 of the body 4 and located on both the exterior 8 and interior 9 lateral surfaces. Further up the vertical length of the body, there is provided a second set of second electrodes 7, again provided on both the exterior 8 and interior 9 lateral surfaces. It will be understood that in other embodiments, further sets of second electrodes may be provided along the vertical length of the body. In use, the second electrodes are configured to have a common potential, so that a potential difference is generated between each second electrode 7 and the grounded body 4, thereby creating an electro-osmosis effect in the respective adjacent regions of soil. That said, to avoid short circuiting during the initial stages of installation where the second set of second electrodes 7 is still above the soil 2, a switch may be provided to disconnect the second set of second electrodes 7 from the power supply circuit. As such, the second set of second electrodes may remain uncharged until they are safely below the soil line, after which they may be connected to the power supply circuit to create the electro-osmosis effect in that region. After installation, the foundation may again be stabilised by reversing the polarity of the power supply so that the sets of second electrodes 7 act as cathodes and pore water is driven away from the anodic lateral surface 8 of the body 4.

Figure 7:
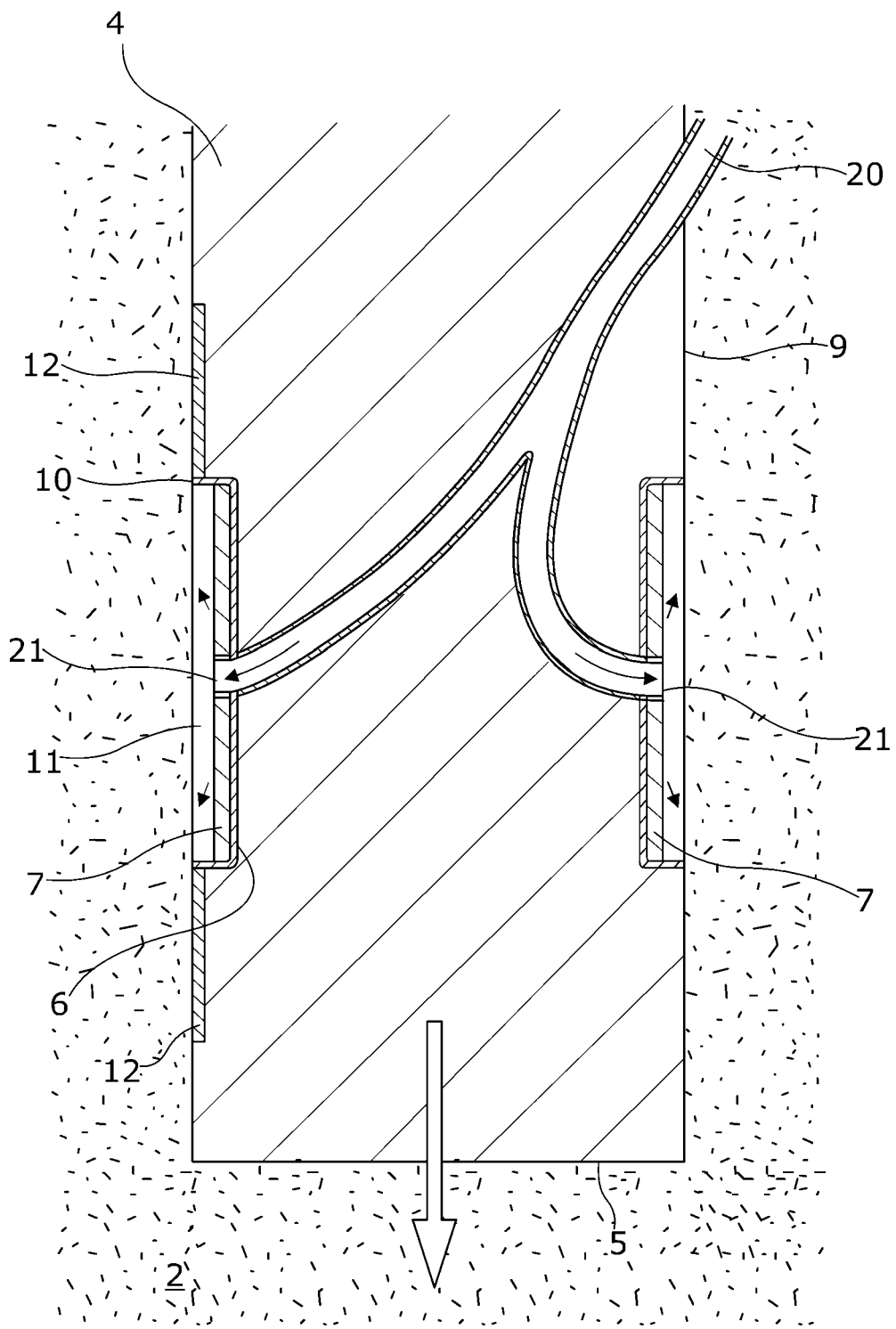
FIG. 7 shows an enlarged view of region A shown in FIG. 6.

As shown in FIG. 6 and described in further detail in reference to FIG. 7, the third embodiment further comprises a fluid pipe system 20. The fluid pipe system 20 allows for fluid to be delivered and/or drained from the second electrodes 7. In this respect, FIG. 7 shows an enlarged view of the region A identified in FIG. 6. As shown, fluid pipe system 20 feeds down the internal lateral surface 9 of the body 4 through a manifold formed within the body and opening at fluid ports 21 provided in the lateral face of each second electrode 7. The internal bore of the fluid pipe system 20 is electrically insulated from the body 4 for avoiding short circuiting through fluid passing there through. This electrical insulation doesn't need to extend through the entire system, but only as far as to sufficiently limit or avoid short circuiting. It will be understood that that although the fluid pipe system in this embodiment is provided integrally, it could also be mounted to the outside of the foundation body.

As discussed above, during driving of the foundation, when the second electrode 7 is acting as the anode and the body 4 is the cathode, pore water is driven away from the second electrode and attracted to the surface of the body 4. This has the effect of dehydrating the soil 2 adjacent to the second electrode 7. The provision of fluid pipe system 20 in this embodiment therefore allows water to be fed out of fluid ports 21 for re-hydrating the gap 11 and the adjacent soil. This may be achieved by having the proximal end of the fluid pipe system open to sea water, thereby allowing sea water to be drawn down to the gap 11. Alternatively, a pumping system may be provided to deliver water to the gap 11. The delivery of water to the gap 11 firstly helps to maintain the electrolyte fluid connection between the anode and cathode, and hence ensure the electro-osmotic flow of water to the cathodic body 4. Secondly, the pumped water also acts to maintain the gap 11 formed by recess 6 as soil 2 closes back in on the foundation body 4. In the absence of water from fluid ports 21, soil could otherwise re-enter the gap 11. This may be due to one or more of elastic half space relaxation, a vacuum effect caused by water being driven away from the anode, soil being squeezed into the gap because of ambient stress conditions, soil particles falling into the gap in case of non-cohesive soil, soil filling the gap with slurry formed below the gap due to the electro-osmotic lubrication effect, or soil being scraped off the surrounding soil surface as the upper edge of the gap advances downwards. The water pumped from the fluid ports 21 therefore may help to avoid any localised adhesion at the anode. In some embodiments, additives may further be introduced to the fluid water pumped from fluid ports 21, for example, to enhance its conductivity or provide chemical stabilisation. In other embodiments, two ports may be used for circulating water and/or electrolyte. The port(s) may also be used to finalize the installation by supplying grout or similar material for sealing the piping system and displacing any remaining water which is trapped in the gap 11.

In this connection, the delivery of fluid at the fluid port may be used to neutralise or dilute the acidity generated at the anode. That is, in addition to the electro-osmotic effect, electrolysis results in chemical oxidation and reduction reactions at the anode and cathode respectively. The range of possible reactions depends on what ionic species are available or present and thus the introduction of tailored conditioning agents can serve to enhance or suppress particular reactions. As an example, in pure water with inert electrodes $H_2$ gas and $OH^-$ anions are generated at the cathode and $O2$ gas and $H^+$ cations are generated at the anode. As a result of the electric field, the cations and anions migrate towards cathode and anode respectively. Because of the higher mobility of $H^+$ cations, the associated acid front generally sweeps across a larger volume of soil compared to that swept by hydroxide anions. This acidity in the soil can have several unwelcome effects including reducing biological activity, lowering the electro-osmotic permeability of the soil and accelerating corrosion of the foundation itself. To counter these effects, chemical conditioning fluid may be pumped from ports 21 to neutralise or dilute the positively charged $H^+$ ions. In addition, conditioning fluids may be selected to modify the surface chemistry of clay particles, or to precipitate cements in pore spaces. Such changes can increase the strength and stiffness of the soil. For instance, during phases of normal polarity, lime or calcium chloride solutions may be introduced through ports 21 as modifying agents, upon reverse polarity such conditioners could include sodium silicate to participate in cementation reactions.

As a further feature of the fluid pipe system 20, fluid may also be drained from the second electrode 7 in a stabilising operation. That is, as mentioned above, when the foundation has reached the required depth, the polarity of the power supply may be reversed so that water is attracted to the second electrode 7 acting as the cathode. As pore water migrates to this region, the fluid pipe system 20 may be pumped to draw water though fluid ports 21, and up the system to be exhausted into the sea. As such, the soil around the foundation 1 can be dehydrated to stabilise it, while excess water that would otherwise collect at the second electrode is removed.

As a further feature of the fluid pipe system 20, a cementing or hardening material may be delivered though the fluid ports 21 to enhance the fixture of the foundation. For example, in the final stage of installation, a cementing suspension may be pumped from the fluid ports 21. This may act to displace water in the gap 11, which might otherwise soften the soil surrounding the second electrode over time. At the same time, this cementing suspension may also bind with surrounding soil particles to form a hardened cemented region of soil adjacent to the foundation. For example, a material which acts as a glue or changes the salinity of the soil itself to increase clay strength may be used for firming the foundation.

Figure 8:
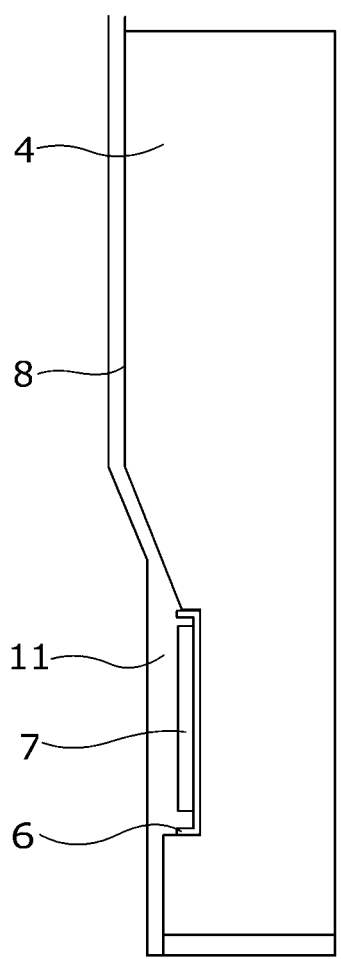
FIG. 8 shows a cross-sectional view of a region of the distal end of a foundation according to a fourth embodiment of the invention.
Figure 9:
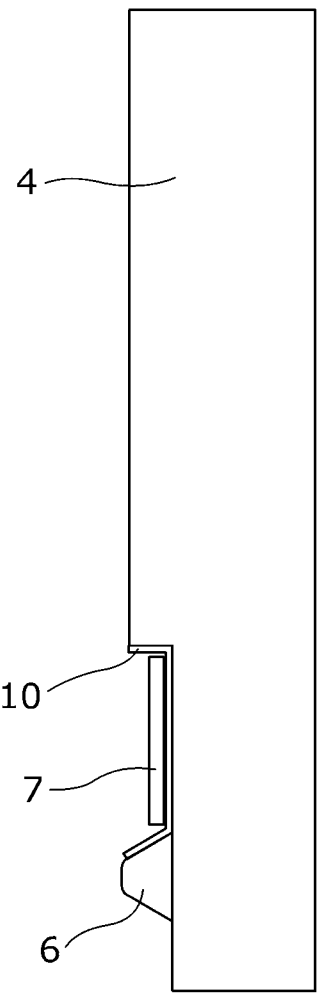
FIG. 9 shows a cross-sectional view of a region of the distal end of a foundation according to a fifth embodiment of the invention.

FIGS. 8 and 9 show part of the distal ends of foundations according to two further embodiments of the invention. In these embodiments, other spacing formations 6 are utilised to displace soil away from the second electrode 7. In FIG. 8, the distal end 5 of the body 4 has a tapered profile, with an indented recess 6 for seating the second electrode 7. As such, the main lateral face 8 of the body 4 protrudes further from the plane of the second electrode 7. In FIG. 9, the spacing formation is provided as a welded bead or fixed ridge which is distally ahead of the second electrode 7.

Figure 10:
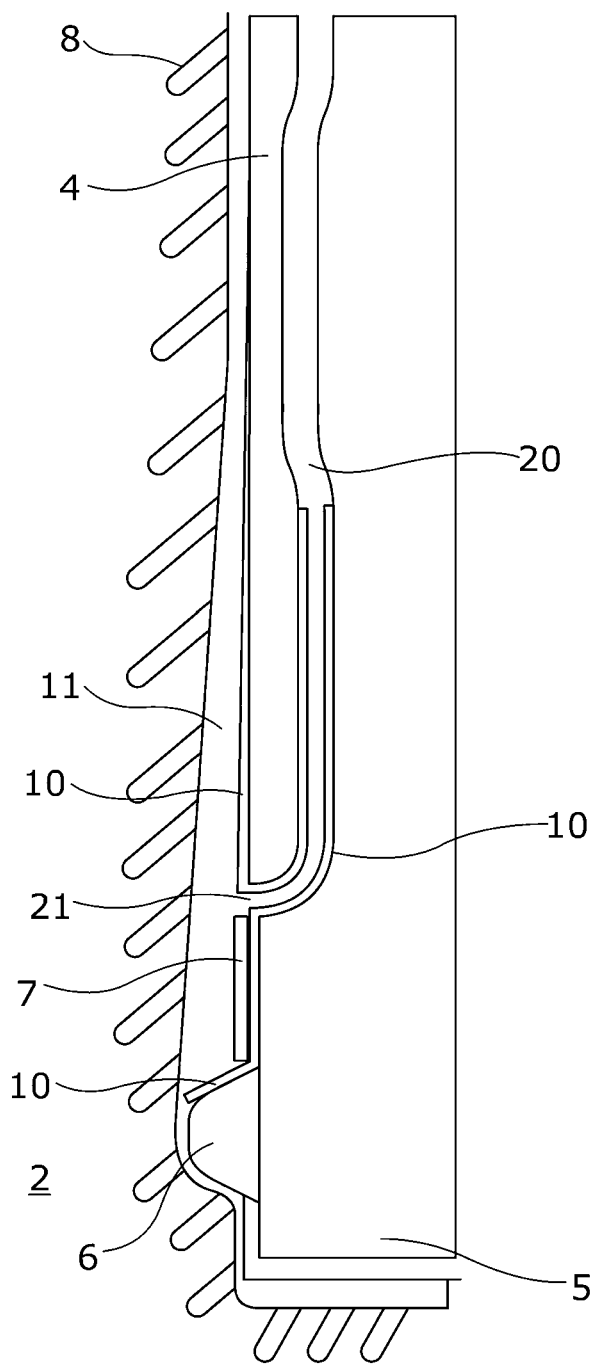
FIG. 10 shows a cross-sectional view of a region of the distal end of a foundation according to a sixth embodiment of the invention.

FIG. 10 shows part of the distal end of a foundation according yet a further embodiment, with effect of the half-space relaxation of the soil 2 being illustrated. In this embodiment, a bead or ridge spacing formation 6 is used, along with a fluid pipe system 20. As shown, the distally leading edge of the spacing formation 6 acts to displace the soil away from the second electrode 7 and lateral surface 8 of the body 4. After this displacement, the soil 2 relaxes back towards the foundation to form a contact with the lateral surface 8. As shown, in this embodiment the insulating layer 10 extends from a distance within the interior bore of the fluid pipe system 20 to prevent short circuiting. The insulating layer 10 also extends vertically up over the lateral surface 8 of the body 4 to beyond a point where the soil 2 is back in contact with the foundation 4 due to half-space relaxation. This arrangement is to mitigate the risk of short circuiting through pore-water that has drained into the extended gap 11 created by spacing formation 6.

Figure 11:
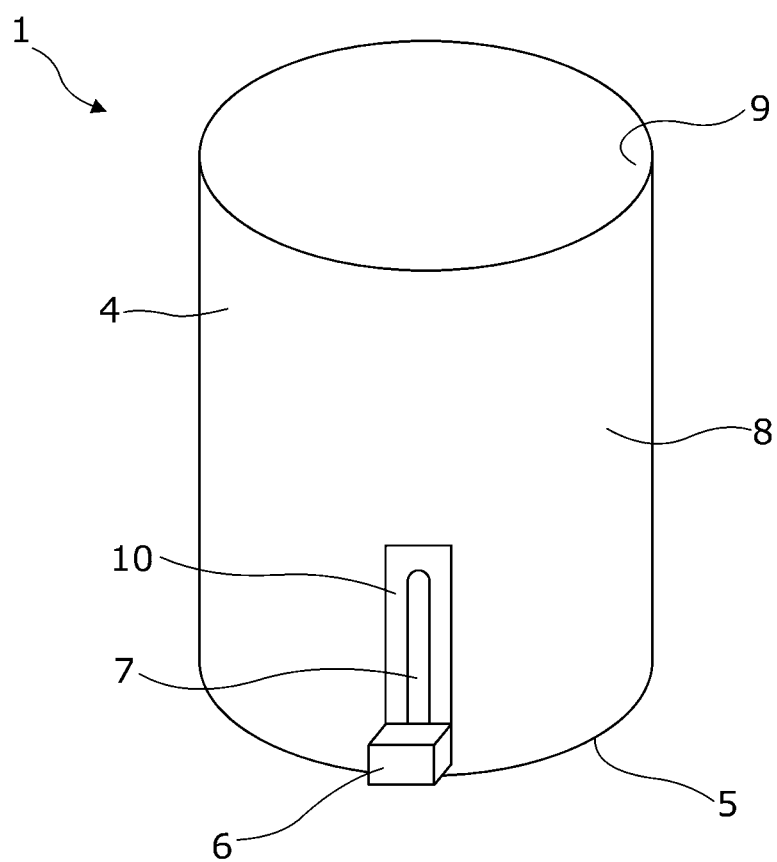
FIG. 11 shows a perspective view of a region of the distal end of a foundation according to a seventh embodiment of the invention.

In the above embodiments, the second electrodes 7 and spacing formations have been provided as circumferential arrangements. However, vertical configurations are also possible and FIG. 11 shows a perspective view of one such arrangement. FIG. 11 shows the distal end 5 of a foundation body 4 where a spacing formation 6 is provided as a block which laterally protrudes from the lateral surface 8 of the body 4. The spacing formation 6 forms a leading edge for displacing the soil away from the vertically extending second electrode 7 behind it. The second electrode 7 is electrically separated from the body 4 by an insulating layer 10, which extends forming a border around the second electrode 7 to regulate the field strength and prevent short circuiting. As with previous embodiments, when the second electrode 7 is charged to form an anode and the body 4 is grounded to form the cathode, pore-water in the soil will be attracted to the body, thereby forming a lubricating liquid film. It will be understood that although a single second electrode 7 and spacing formation 6 are shown in FIG. 11, a plurality of second electrodes 7 and spacing formations 6 may be provided around the circumference of the body 4 and/or vertically along its length to distribute the electro-osmosis effect.

Figure 12:
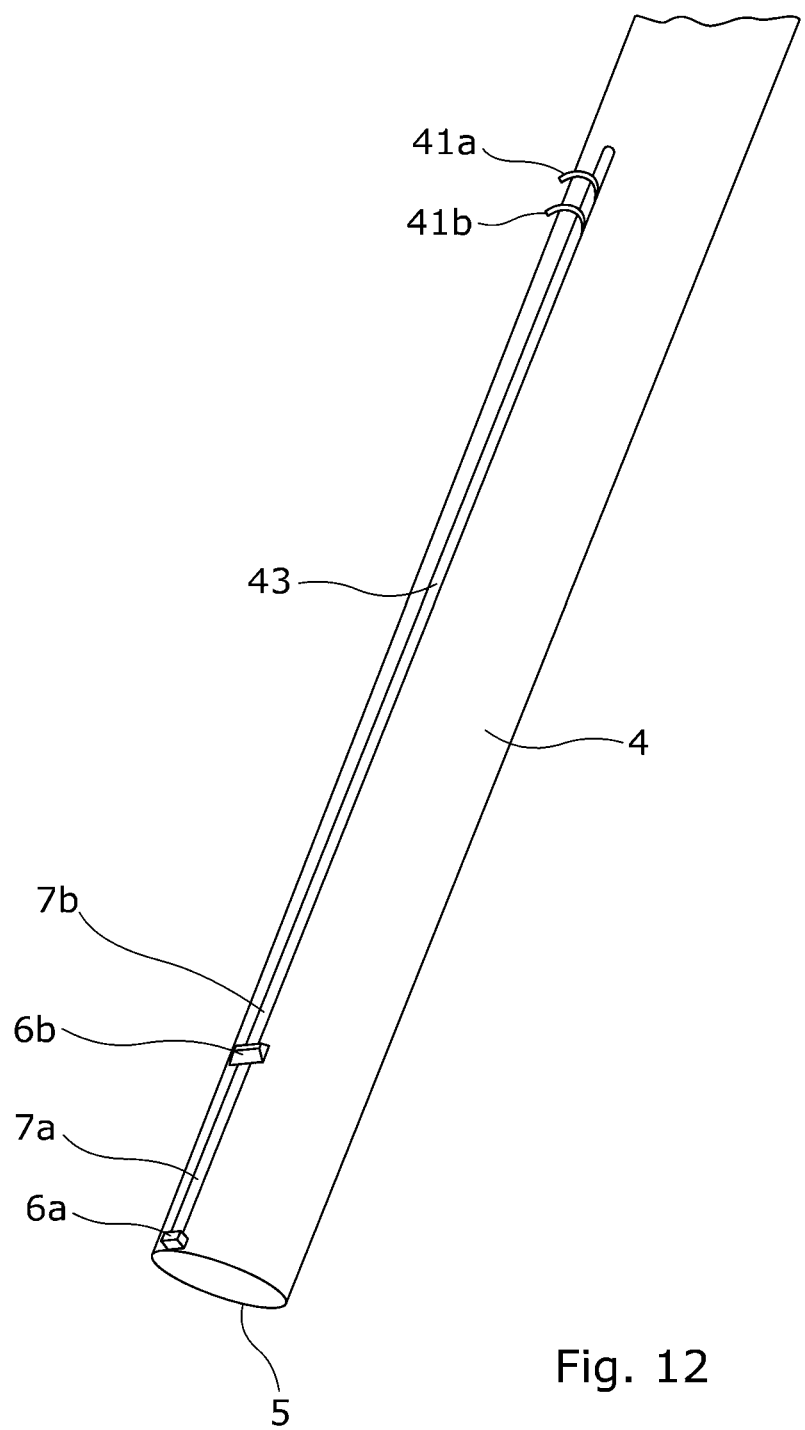
FIG. 12 shows a perspective view of a pile foundation according to an eighth embodiment of the invention.

FIG. 12 shows a perspective view of a pile foundation 4 according to an eighth embodiment of the invention. In this embodiment, the foundation body 4 is provided with two spacing formations 6, with spacing formation 6a being provided at the distal end 5 of the body, and intermediate spacing formation 6b being proximally spaced further up the axial length of the body 4. In use, the spacing formation 6a functions as a leading edge for displacing the soil away from the vertically extending second electrode 7a located proximally above it. Similarly, in use, intermediate spacing formation 6b acts to displace the soil away from the vertically extending second electrode 7b located proximally above it. Second electrodes 7a and 7b are respectively connected to connectors 41a and 41b located at the proximal end of the foundation body 4 via connector strip 43. It will be understood that although in this embodiment two second electrodes are shown, in other embodiments, more than two second electrodes may be provided, with each having an associated spacing formation.

As is discussed in further detail below, the connector strip 43 in this embodiment comprises stacked sheet metal strips separated by insulating layers for delivering an electrical charge to the second electrodes, as well as fluid to the surface of the second electrodes using integrally formed fluid tubes. However, it will be understood that the metal strips do not necessarily need to be stacked, and could alternatively be provided as parallel tracks down the foundation body, terminating at different depths.

Furthermore, it will also be understood that, instead of metal strips, the connector strip 43 may instead comprise braids or wires. The strips, braids, or wires may also be glued onto the surface of the foundation body.

Figure 13A:
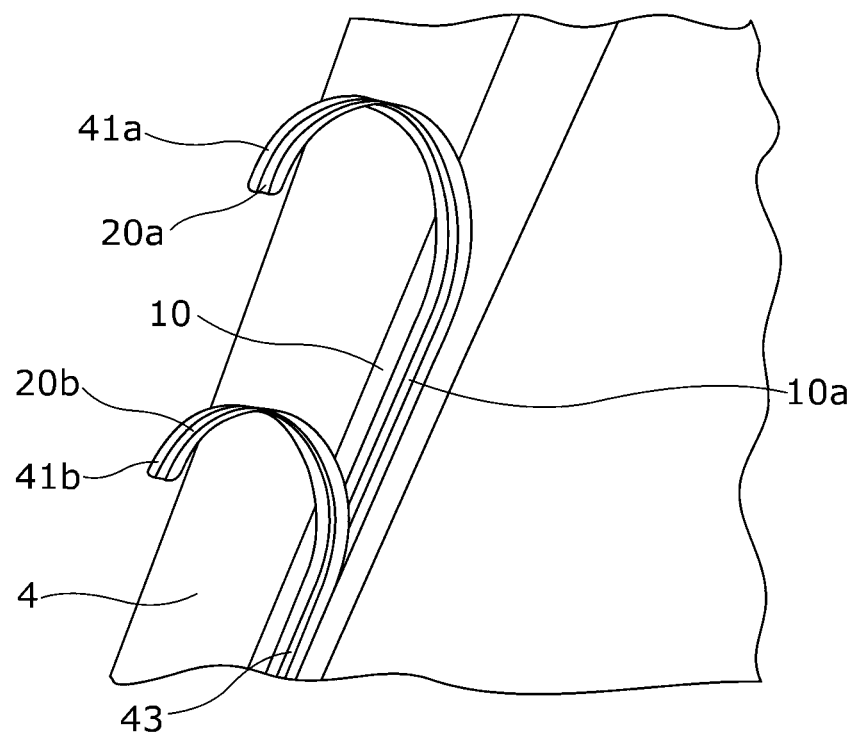
FIG. 13a-13c show enlarged views of features of the eighth embodiment shown in FIG. 12, with FIG. 13(a) showing the connectors, FIG. 13(b) showing an intermediate spacing formation, and FIG. 13(c) showing a distal spacing formation and an irrigation channel.

As shown in FIG. 13(a), in this embodiment, the connector strip 43 comprises two connector layers, layered over one another, and electrically insulated from the foundation body 4 by insulating strip 10. Intermediate insulating layer 10a is provided between the connector layers 41a and 41b to electrically insulate the layers from one another. Connector 41a forms an electrical contact to second electrode 7a and connector 41b forms an electrical contact to second electrode 7a. At the proximal end of the foundation body 4, as shown in FIG. 13(a), the connector layers curve away laterally from the foundation body to form two separate curved connectors 41a and 41b. The separate connectors are independently connectable to the power source to allow the charges applied through them to second electrodes 7a and 7b to be controlled individually.

Connectors 41a and 41b, and their associated connector layers, also further comprise fluid pipes 20a and 20b, respectively, for feeding fluid to the surface of the second electrodes 7a and 7b.

The curved shape of each of the connectors 41a and 41b forms a resilient spring like formation to allow some axial relative movement between the ends of the connectors and their attachment to the foundation body 4. As such, when the foundation is impacted during the driving phase, the resilience provided by the spring formations avoids the impact shocks from shearing the connectors 41a and 41b from their connection to the power source and fluid pump.

Figure 13B:
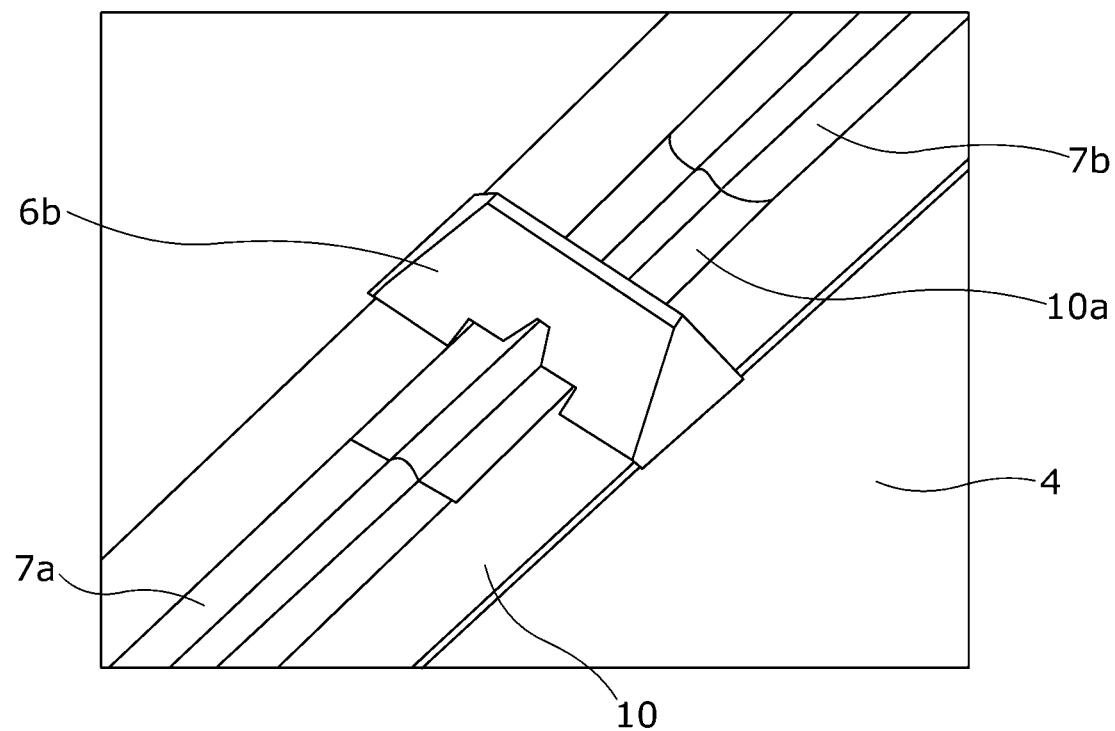

FIG. 13(b) shows an intermediate spacing formation 6b, which is provided as a wedged metallic formation fitted over the insulating layer 10 and the intermediate insulating layer 10a and secured to the foundation body 4. As such, the intermediate spacing formation 6b also functions as part of the first electrode, and hence acts as a cathode during the driving phase to benefits from the lubrication effect.

Figure 13C:
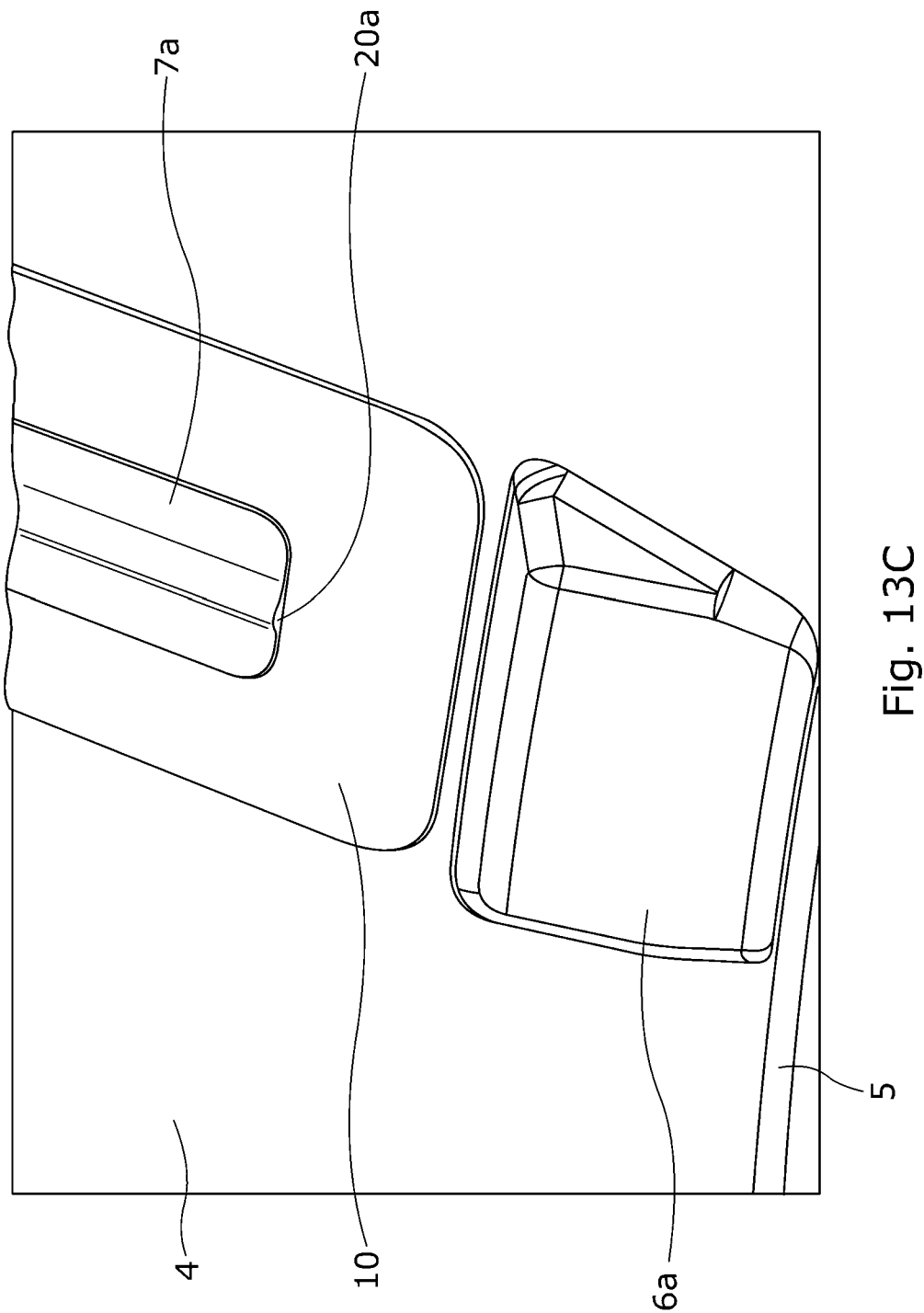

FIG. 13(c) shows the distal end 5 of the foundation body 4. The distal spacing formation 6a is provided at the distal end, and is formed in this embodiment as a welded-on metal wedge. The insulating layer 10 is provided as an adhesive strip bonded to the foundation body beneath and the metal strip forming the second electrode 7a above. The insulating layer could also be painted or sprayed on. The connector layer forming the second electrode 7a comprises a channel forming fluid pipe 20a for delivering fluid.

With the embodiment shown in FIGS. 12 and 13, by providing a plurality of second electrodes 7 and spacing formations 6 vertically along the pile 4, the electro-osmosis effect can be distributed over a larger distance. Furthermore, by allowing the second electrodes 7a and 7b to be controlled independently, short circuiting can be avoided by delaying charging of second electrode 7b until it is submerged beneath the soil.

Figure 14:
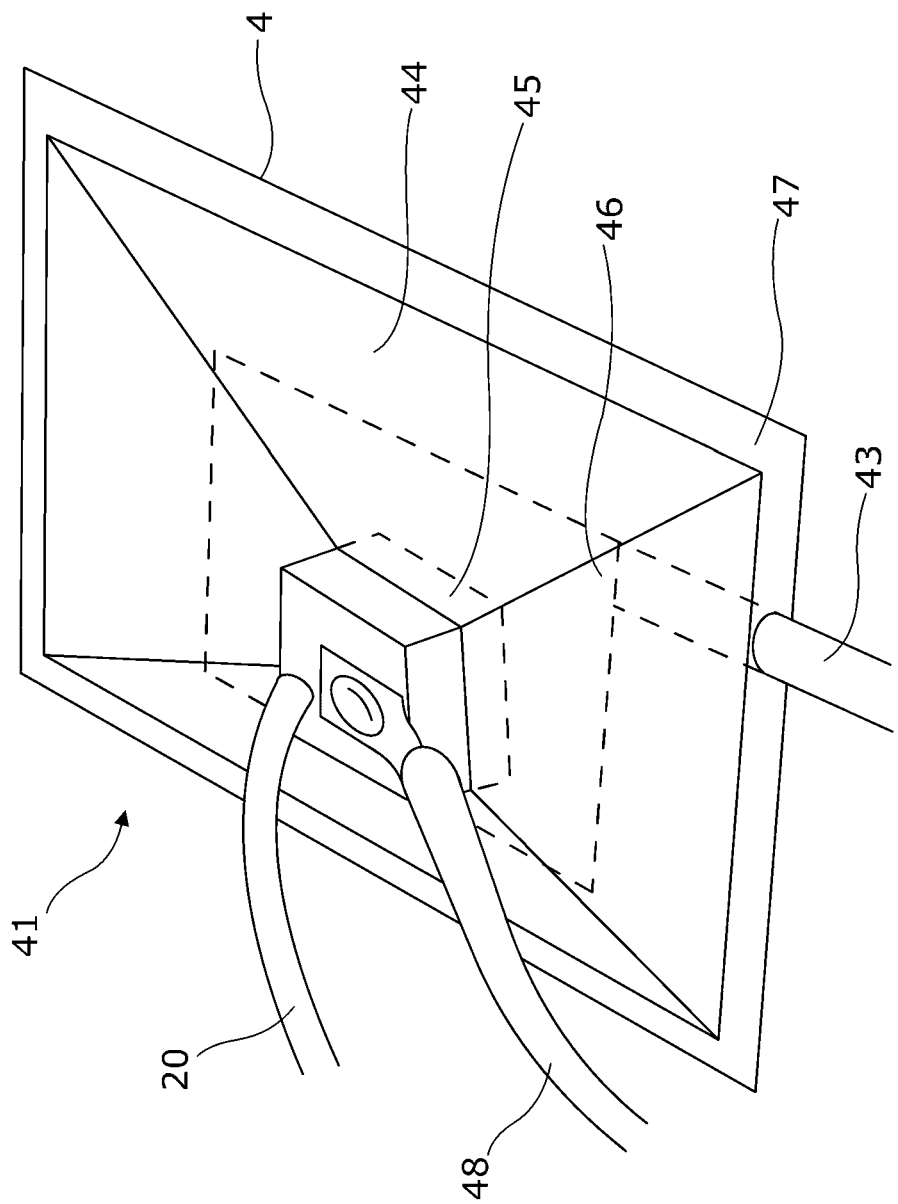
FIG. 14 shows a perspective view of a connector according to a further embodiment.

FIG. 14 shows a perspective view of a connector 41 according to a further embodiment of the invention and for use as an alternative to connector 41a or connector 41b shown in FIG. 13(a). In this embodiment, the connector 41 comprises a frame 47 which is mounted to the outer surface of the foundation body 4. The interior of frame 4 supports an elastic membrane 44 which resiliently holds conductive contact block 45 against contact pad 46 provided on the surface of the foundation body 4. The contact block 45 may thereby slide over the surface of the contact pad 46, whilst remaining in contact therewith. Contact block 45 may further comprise a magnet attracted to the foundation body in order to help maintain its contact with the contact pad 46.

The contact pad 46 is electrically insulated from the foundation body 4 and comprises a conductive outer face which is electrically connected to connector strip 43, which in turn connects to the second electrode. The contact block 45 is electrically connected to the power supply through wire 48. Furthermore, fluid pipe 20 feeds into the interior of elastic membrane 44 for delivering fluid to fluid channel 20 embedded within connector strip 43, which in turn feeds fluid to the surface of the second electrode.

With the above arrangement, the contact block 45 is able to resiliently move relative to the contact pad 46 during the driving phase to mitigate the impact forces applied to the connector. As with the previous embodiment, this avoids the impact shocks from shearing the wire 48 and fluid pipe 20 at their connection to the foundation.

FIGS. 15 to 18 show embodiments of an alternative inventive arrangement in the form of a spudcan foundation. In this alternative inventive arrangement, effectively the same electro-osmosis may be achieved as with the above embodiments. However, as the spudcan has a wide, cone shaped base, the second electrode is provided at the distal end to concentrate the electro-osmosis effect over this body. In the case of a spudcan, the electro-osmosis effect does not necessarily need to be used during installation, unless it is required to install through a thin strong layer of soil to reach a weaker soil layer underneath and thereby continue penetrating the leg until safe soil is reached. However, the reverse electro-osmosis effect may advantageously be used once the foundation is in place to strengthen the soil. During retrieval of the foundation, the effect may also be used to break adhesion between soil and metal foundation body, to allow water to migrate into the gap below and prevent a vacuum, and to lubricate the sides of the spudcan. This may thereby allow easier removal of the foundation from cohesive soils.

Figure 15:
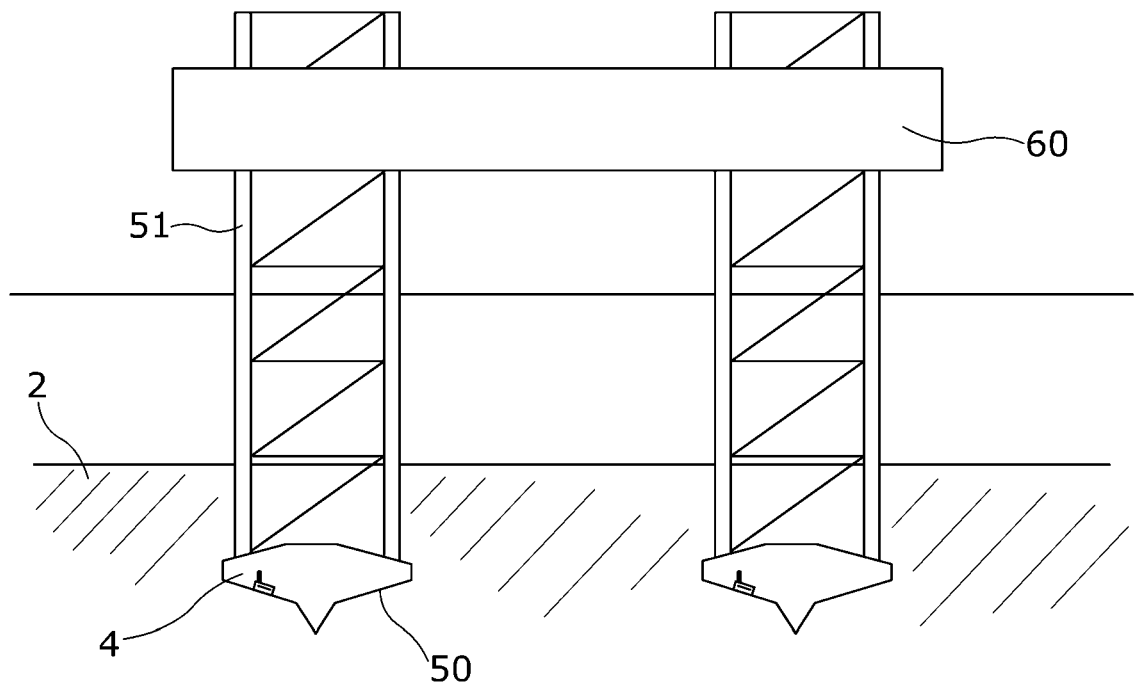
FIG. 15 shows a schematic side view of a jack-up rig with spudcan foundations according to an embodiment of an alternative inventive arrangement.

In this connection, as shown in FIG. 15, each spudcan foundation 4 comprises a spudcan base cone 50 at the base of a jack-up leg 51, which are used to support a jack-up platform 60, such as a mobile-drilling platform or an installation vessel with a crane. When deployed by mobile-drilling platform 60, the spudcans are driven into the sea bed to sufficient depth to provide stability to lateral forces on the platform 60, and may allow the platform 60 to be jacked up above the water level.

Figure 16:
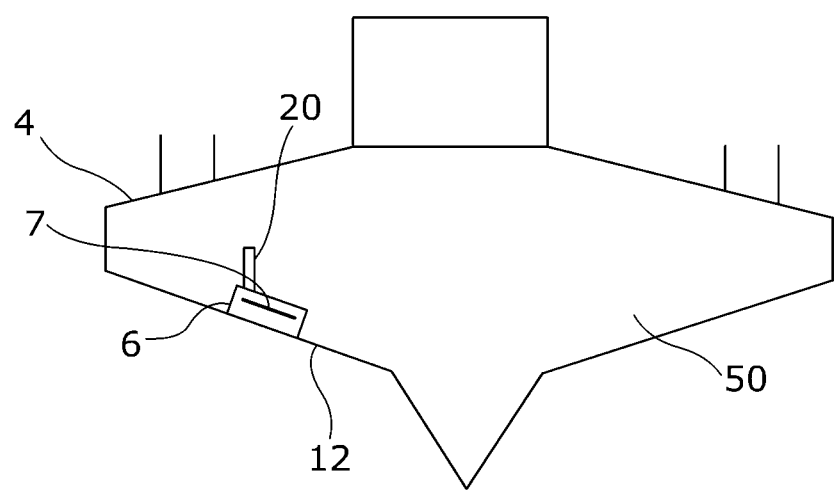
FIG. 16 shows an enlarged cross-sectional view of the spudcan shown in FIG. 15.

FIG. 16 shows an enlarged cross-sectional view of the spudcan shown in FIG. 15. In this embodiment, the base cone 50 is provided as a first electrode, for example, by forming the cone as a conducive metal body or by providing a conductive coating over regions of its surface. The second electrode 7 is provided in a recess 6 formed in the sides of the base cone 50 and is insulated from the first electrode.

Resistive coating regions 12 are provided on the surface of the base cone 50, around the sides of the recess 6. As with previous embodiments, the resistive coating regions 12 act to control the electric field strength distribution in the soil generated between the base cone 50 and second electrode 7, and to prevent short circuiting.

The recess 6 provides a spacing formation which, in use, fills with water to provide a water cushion for preventing contact between the soil and second electrode 7. In embodiments, the recess 6 may contain a porous, non-conductive, filler material to further assist with maintaining separation between the soil and the second electrode 7. The filler material may be, for example, formed of a plastic sponge, and is sufficiently strong to resist damage as it is compressed by the soil, whilst being sufficiently porous to allow fluid to pass through it. Water or electrolyte fluid may be fed into the recess cavity using feeding pipe 20. Conversely, to stabilise the foundation, the polarity applied to the electrodes is reversed and water attracted to the second electrode 7 may be drained from the recess 6 using fluid pipe 20.

Figure 17A:
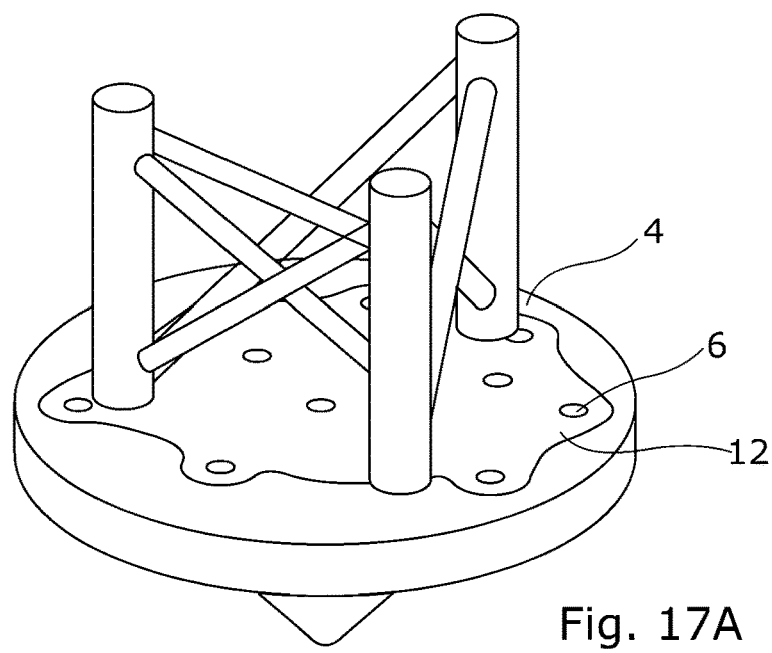
FIG. 17a-17c show a spudcan foundation according to another embodiment, with FIG. 17(a) showing a top perspective view, FIG. 17(b) showing bottom perspective view, and FIG. 17(c) showing a cross-sectional schematic view through a section of the spudcan.
Figure 17B:
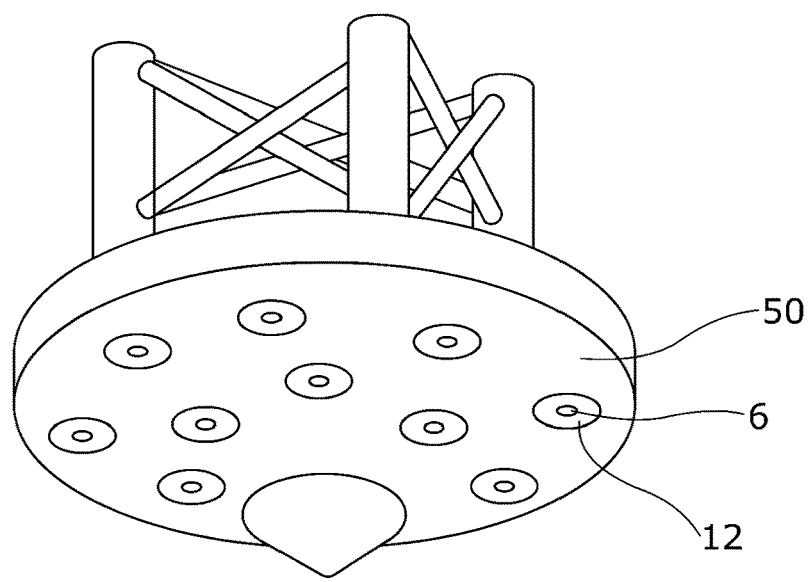
Figure 17C:
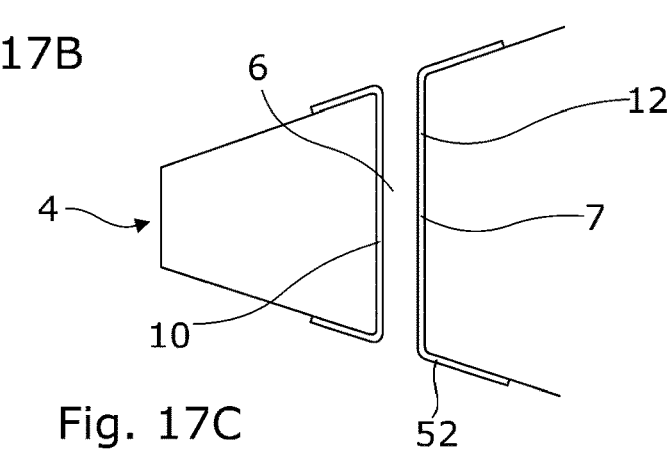

FIG. 17a-17c show a spudcan foundation 4 according to another embodiment of this inventive arrangement. FIGS. 17a and 17b showing perspective views of the spudcan. In this embodiment, a plurality of spacing formations is provided in the form of a plurality of tubes 6, distributed over the width of the body of base cone 50.

FIG. 17c shows a cross-sectional schematic view through a section of the spudcan 4 and a single tube 6. As shown, each tube 6 extends vertically through the spudcan body 50 and houses second electrode 7, which is thereby recessed within the body away from the surrounding soil. The second electrode 7 is insulated from the spudcan body 50 by insulating layer 10, which extends behind the second electrode. Resistive layer 12 extends out through the tube 6 and over a region of the body surrounding the tube's opening, as shown in FIGS. 17a and 17b. As with previous embodiments, the resistive coating region 12 is used to control and direct the electric field around to the exposed major surfaces of the spudcan body providing the first electrode. Grating 52 is provided at the opening of the distal end of the tube 6 to prevent soil from entering the interior bore. The grating 52 may be formed of a coated metal or fibre reinforced material. As will be appreciated, the electro-osmosis effect functions in the same way as previous embodiments above, by generating an electric field between the first and second electrodes. Advantageously, with this embodiment, by providing the second electrode over the inner bore of the tube 6, a large surface area is provided for generating the electric field. At the same time, the tubular electrodes also allow water to be drained away from below the foundation for improving in-place stability and, when the spudcan is pulled out of the ground, water can drain from above the spudcan through the tubes and into the gap below the spudcan to prevent suction pressures during retrieval. It will also be understood that in other embodiments, the tube 6 could be closed at the top and connected to a fluid supply for delivering or draining water or electrolyte from the tube.

FIGS. 18a-18d show cross-sectional schematic views through four further spudcan embodiments. These embodiments are variants of the embodiment shown in FIG. 17c, where the second electrode is imbedded within the spudcan and, as such, these examples function in essentially the same way and corresponding reference numerals have been used for corresponding features.

Figure 18A:
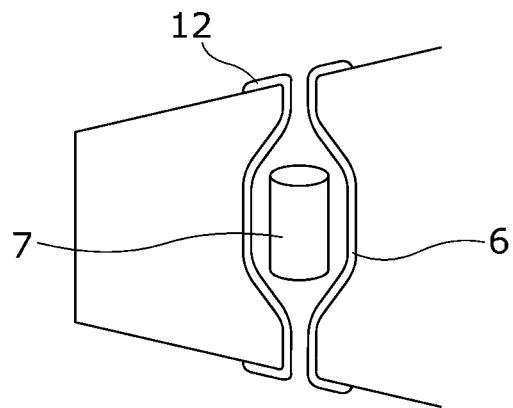
FIG. 18a-18d show cross-sectional schematic views through four further spudcan embodiments.
Figure 18B:
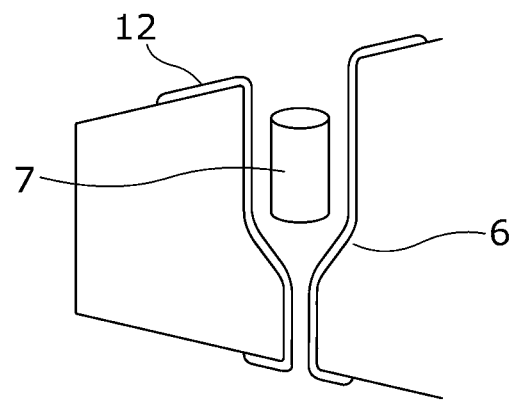

In the embodiment shown in FIG. 18a, the tube 6 is provided with a reduced diameter either side of the electrode tube 7. This thereby allows the surface area of the second electrode 7 to be maximised relative to the tube's openings and the tube diameter to be tuned to control the electric resistance. In the embodiment shown in FIG. 18b, the tube 6 is formed with a narrowed distal opening for minimising soil from entering, whilst allowing water to flow through.

Figure 18C:
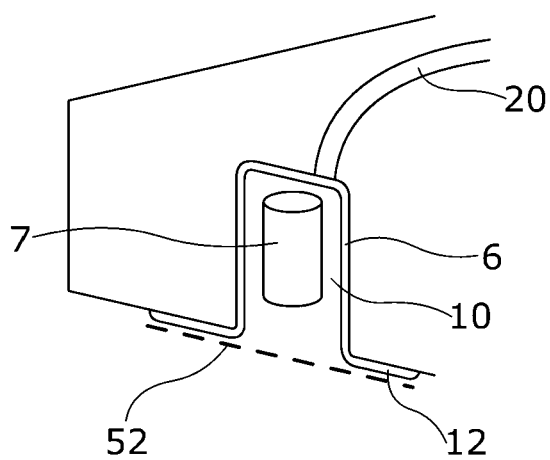
Figure 18D:
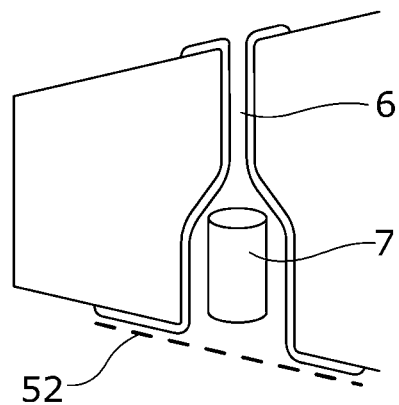

In the embodiment shown in FIG. 18c, a tubular recessed cavity 6 is formed in the distal end of the spudcan, with the opening to the cavity being covered by non-conductive grate 52 for preventing soil from entering. Piping 20 is further provided for delivering water or electrolyte to the cavity 6. In the embodiment shown in FIG. 18d, the tube 6 is provided with a long narrow channel above the second electrode 7 for directing the electric field to generate a relatively stronger field beneath the spudcan.

As will be appreciated, the inventive arrangements disclosed herein allow a foundation to be driven into the soil more easily, without significantly extending the set-up time required at the foundation location. This reduces cost, provides a more stable foundation, and allows installation noise to be mitigated in the case of pile foundations, which is particularly important for offshore applications.

It will be understood that the embodiments illustrated above show applications of the invention only for the purposes of illustration. In practice the invention may be applied to many different configurations, the detailed embodiments being straightforward for those skilled in the art to implement.

For example, it will also be understood that the foundation may further comprise other elements for maintaining separation between the soil and the second electrode. For example, a spacer element may be provided in the recess for allowing water to drain in, but keeping the soil particles separated. For instance, a grated screen or a sponge or ribbed material may be provided. In addition, further spacing formations may be provided to maintain a soil gap over the second electrode(s) and combinations of spacing formations may also be used. For instance, a spacing projection may be provided distally ahead of a recess housing the second electrode to enhance soil separation over it.

Furthermore, although in some of the above illustrative embodiments, the foundations have been hollow bodies such as monopiles and bucket foundations, other foundations are also possible, such as axial piles and sheet piles, spudcans, and other gravity base foundations.

As well as wind turbines, the present invention may also be used for other structures, such as offshore platforms and sheet walls or dolphin piles.

In addition, although in the above illustrative embodiments, the system has been described using a power supply provided on the installation vessel, it will be understood that other arrangements are possible. For example, a battery or generator located on the foundation or structure itself may be used as a power supply. This may, for instance be used to apply an electro-osmosis effect for a longer period after the foundation has been installed, with the second electrode acting as a cathode for gradually increasing the soil strength around the foundation body by pushing water away from it.

Moreover, although the present invention has been described in reference to offshore locations, it will be understood that the invention may be used in other locations where the soil has a sufficiently high moisture content for electro-osmosis. This may include, for example, fine-grained, cohesive clay sediments, low permeable problem soils, expansive soils, dispersive soils, high compressible clays, marine clays, sensitive clays, quick clays, saline/sodic soils, and soft peat. Such soft clay soils are often associated with costal soils, as well as estuaries, river and lake-side locations.

An addition, although in the above embodiments, the second electrode has been described as a solid body, it will be understood that it may be formed of a porous material, such as a perforated metal plate/sheet, metal sponge/braid. In such embodiments, the second electrode may be irrigated from a port at its rear, with the fluid flowing through the electrode body to the soil gap in front. With such an arrangement, it may also be possible to irrigate the second electrode by providing a vertical feeder channel or space behind the electrode for delivering seawater to the electrode.

It will also be understood that the present invention also allows for periodic re-strengthening of the soil around the foundation by reactivating the electro-osmosis effect to repel water from body 4 and drain water collected at the second electrode 7. Equally, the present invention may allow for simplified retraction of the foundation during decommissioning by reactivating the electro-osmosis effect to form a fluid lubricating film over the body 4 and thereby ease its withdrawal from the soil.

In this respect, with the invention, by applying a DC voltage across different parts of the foundation, two electro-osmosis effects are generated in the surrounding soil. Firstly, electro-osmosis causes the movement of water which acts to weaken or strengthen the soil depending on the direction of flow. As such, an excess of soil pore pressure may be generated to lubricate the soil/foundation interface with a water film during installation or removal. Alternatively, a negative pore pressure may be used to restore or improve soil structure and interface friction for stabilising the foundation. The second effect of electro-osmosis is that it acts to move ions within the soil, relative to the foundation. This may be used, for instance, to consolidate soft clay or other cohesive soils around the foundation for strength. The ion effect may also allow infiltration of cementing electrolytes to cement the foundation in place, which may be particularly useful with granular soils.

The invention claimed is:

1. A foundation for a structure comprising:
    a body having a lateral surface and a distal end for insertion into a soil, wherein at least a region of the lateral surface forms a first electrode;
    a second electrode electrically insulated from the first electrode; and
    wherein the second electrode is provided on the lateral surface of the body and the entire length of the second electrode is in contact with the lateral surface, and the body further comprises a spacing formation establishing a gap between the second electrode and the soil in which gap the second electrode is accommodated when the body is inserted into the soil such that the second electrode is separated from the soil; and
    wherein the first electrode and second electrode are operable together for facilitating the insertion of the body into the soil.

2. The foundation according to claim 1, wherein the spacing formation comprises a recess.

3. The foundation according to claim 2, wherein the second electrode is provided within the recess.

4. The foundation according to claim 1, wherein the spacing formation comprises a lateral projection for displacing a portion of the soil away from the second electrode when the body is inserted into the soil.

5. The foundation according to claim 1, wherein the second electrode is electrically insulated from the first electrode by an insulating layer provided there between.

6. The foundation according to claim 1, further comprising a resistive coating provided on the lateral surface of the body for regulating spatial distribution of electric field strength between the first and second electrodes.

7. The foundation according to claim 1, further comprising a fluid port for supplying fluid to a surface of the second electrode or draining fluid from the surface of the second electrode.

8. The foundation according to claim 1, further comprising terminals for connecting the first and second electrodes to an electric power supply.

9. The foundation according to claim 1, wherein the body is electrically conductive for functioning as the first electrode.

10. The foundation according to claim 1, further comprising a plurality of second electrodes and wherein the body further comprises a plurality of spacing formations for forming gaps between respective ones of the plurality of second electrodes and the soil when the body is inserted into the soil.

11. The foundation according to claim 1, further comprising:
    a wind turbine; and
    a generator assembly for generating electricity from wind; wherein the foundation supports the generator assembly.

12. The foundation according to claim 1, further comprising:
    a power supply for applying a potential difference across the first and second electrodes such that the first electrode is a cathode and the second electrode is an anode for attracting water in the soil to the first electrode to facilitate the insertion of the body into the soil.

13. A method of stabilising a foundation that has been inserted into soil, the foundation for a structure comprising a body having a lateral surface and a distal end for insertion into a soil wherein at least a region of the lateral surface forms a first electrode; a second electrode electrically insulated from the first electrode, wherein the second electrode is provided on the lateral surface of the body and the entire length of the second electrode is in contact with the lateral surface, and the body further comprises a spacing formation establishing a gap between the second electrode and the soil in which gap the second electrode is accommodated when the body is inserted into the soil such that the second electrode is separated from the soil, and wherein the first electrode and second electrode are operable together for facilitating the insertion of the body into the soil, the method comprising:
    connecting the second electrode to a negative terminal of a power supply for the second electrode to function as a cathode;
    connecting the first electrode to a positive terminal of the power supply for the first electrode to function as an anode; and
    applying a potential difference across the first and second electrodes for generating an electro-osmotic effect to repel water in the soil away from the first electrode.

14. A method for adjusting a foundation that has been inserted into soil, the foundation for a structure comprising a body having a lateral surface and a distal end for insertion into a soil wherein at least a region of the lateral surface forms a first electrode; a second electrode electrically insulated from the first electrode, wherein the second electrode is provided on the lateral surface of the body and the entire length of the second electrode is in contact with the lateral surface, and the body further comprises a spacing formation establishing a gap between the second electrode and the soil in which gap the second electrode is accommodated when the body is inserted into the soil such that the second electrode is separated from the soil, and wherein the first electrode and second electrode are operable together for facilitating the insertion of the body into the soil, the method comprising:

connecting the second electrode to a positive terminal of a power supply for the second electrode to function as an anode;

connecting the first electrode to a negative terminal of the power supply for the first electrode to function as a cathode;

applying a potential difference across the first and second electrodes for generating an electro-osmotic effect to attract water in the soil to the first electrode; and moving the body in the soil.

\* \* \* \* \*